United States Patent
Taylor et al.

(10) Patent No.: US 11,397,985 B2
(45) Date of Patent: Jul. 26, 2022

(54) METHOD AND APPARATUS FOR MANAGING ORDERS IN FINANCIAL MARKETS

(71) Applicant: Exegy Incorporated, St. Louis, MO (US)

(72) Inventors: David Taylor, St. Louis, MO (US); Scott Parsons, St. Charles, MO (US)

(73) Assignee: EXEGY INCORPORATED, St. Louis, MO (US)

( * ) Notice: Subject to any disclaimer, the term of this patent is extended or adjusted under 35 U.S.C. 154(b) by 367 days.

(21) Appl. No.: 16/044,614

(22) Filed: Jul. 25, 2018

(65) Prior Publication Data

US 2018/0330444 A1    Nov. 15, 2018

Related U.S. Application Data

(62) Division of application No. 13/316,332, filed on Dec. 9, 2011, now Pat. No. 10,037,568.

(60) Provisional application No. 61/421,545, filed on Dec. 9, 2010.

(51) Int. Cl.
  *G06Q 40/04* (2012.01)
  *G06Q 40/06* (2012.01)

(52) U.S. Cl.
  CPC .............. *G06Q 40/04* (2013.01); *G06Q 40/06* (2013.01)

(58) Field of Classification Search
  None
  See application file for complete search history.

(56) References Cited

U.S. PATENT DOCUMENTS

| | | |
|---|---|---|
| 2,046,381 A | 7/1936 | Hicks et al. |
| 3,082,402 A | 3/1963 | Scantlin |
| 3,296,597 A | 1/1967 | Scantlin et al. |
| 3,573,747 A | 4/1971 | Adams et al. |
| 3,581,072 A | 5/1971 | Nymeyer |
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,044,334 A | 8/1977 | Bachman et al. |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

Gokhale, Maya B. & Graham, Paul S. Reconfigurable Computing. Springer. 2005. pp. 1-209 (Year: 2005).*

(Continued)

*Primary Examiner* — Jason Borlinghaus
(74) *Attorney, Agent, or Firm* — Thompson Coburn LLP

(57) ABSTRACT

An integrated order management engine is disclosed that reduces the latency associated with managing multiple orders to buy or sell a plurality of financial instruments. Also disclosed is an integrated trading platform that provides low latency communications between various platform components. Such an integrated trading platform may include a trading strategy offload engine.

51 Claims, 7 Drawing Sheets

(56) References Cited

U.S. PATENT DOCUMENTS

| | | |
|---|---|---|
| 4,081,607 A | 3/1978 | Vitols et al. |
| 4,298,898 A | 11/1981 | Cardot |
| 4,300,193 A | 11/1981 | Bradley et al. |
| 4,314,356 A | 2/1982 | Scarbrough |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |
| 4,674,044 A | 6/1987 | Kalmus et al. |
| 4,811,214 A | 3/1989 | Nosenchuck et al. |
| 4,823,306 A | 4/1989 | Barbic et al. |
| 4,868,866 A | 9/1989 | Williams, Jr. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,208,491 A | 5/1993 | Ebeling et al. |
| 5,226,165 A | 7/1993 | Martin |
| 5,233,539 A | 8/1993 | Agrawal et al. |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,361,373 A | 11/1994 | Gilson |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,404,488 A | 4/1995 | Kerrigan et al. |
| 5,418,951 A | 5/1995 | Damashek |
| 5,432,822 A | 7/1995 | Kaewell, Jr. |
| 5,461,712 A | 10/1995 | Chelstowski et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,517,642 A | 5/1996 | Bezek et al. |
| 5,544,352 A | 8/1996 | Egger |
| 5,546,578 A | 8/1996 | Takada et al. |
| 5,596,569 A | 1/1997 | Madonna et al. |
| 5,619,574 A | 4/1997 | Johnson et al. |
| 5,651,125 A | 7/1997 | Witt et al. |
| 5,680,634 A | 10/1997 | Estes |
| 5,684,980 A | 11/1997 | Casselman |
| 5,701,464 A | 12/1997 | Aucsmith |
| 5,712,942 A | 1/1998 | Jennings et al. |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,963,923 A | 10/1999 | Garber |
| 5,978,801 A | 11/1999 | Yuasa |
| 5,987,432 A * | 11/1999 | Zusman ............... G06Q 40/00 705/35 |
| 5,991,881 A | 11/1999 | Conklin et al. |
| 5,995,963 A | 11/1999 | Nanba et al. |
| 6,006,264 A | 12/1999 | Colby et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,034,538 A | 3/2000 | Abramovici |
| 6,044,407 A | 3/2000 | Jones et al. |
| 6,058,391 A | 5/2000 | Gardner |
| 6,061,662 A | 5/2000 | Makivic |
| 6,064,739 A | 5/2000 | Davis |
| 6,067,569 A | 5/2000 | Khaki et al. |
| 6,070,172 A | 5/2000 | Lowe |
| 6,073,160 A | 6/2000 | Grantham et al. |
| 6,084,584 A | 7/2000 | Nahi et al. |
| 6,096,091 A | 8/2000 | Harlmnann |
| 6,105,067 A | 8/2000 | Batra |
| 6,134,551 A | 10/2000 | Aucsmith |
| 6,138,176 A | 10/2000 | McDonald et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,243,753 B1 | 6/2001 | Machin et al. |
| 6,247,060 B1 | 6/2001 | Boucher et al. |
| 6,263,321 B1 | 7/2001 | Daughtery, III |
| 6,272,616 B1 | 8/2001 | Fernando et al. |
| 6,278,982 B1 | 8/2001 | Korhammer et al. |
| 6,279,113 B1 | 8/2001 | Vaidya |
| 6,279,140 B1 | 8/2001 | Slane |
| 6,289,440 B1 | 9/2001 | Casselman |
| 6,295,530 B1 | 9/2001 | Ritchie et al. |
| 6,304,858 B1 | 10/2001 | Mosler et al. |
| 6,309,424 B1 | 10/2001 | Fallon |
| 6,317,728 B1 | 11/2001 | Kane |
| 6,317,795 B1 | 11/2001 | Malkin et al. |
| 6,321,258 B1 | 11/2001 | Stollfus et al. |
| 6,336,150 B1 | 1/2002 | Ellis et al. |
| 6,339,819 B1 | 1/2002 | Huppenthal et al. |
| 6,370,592 B1 | 4/2002 | Kumpf |
| 6,370,645 B1 | 4/2002 | Lee et al. |
| 6,377,942 B1 | 4/2002 | Hinsley et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,982 B1 | 9/2002 | Pilipovic |
| 6,463,474 B1 | 10/2002 | Fuh et al. |
| 6,484,209 B1 | 11/2002 | Momirov |
| 6,499,107 B1 | 12/2002 | Gleichauf et al. |
| 6,535,868 B1 | 3/2003 | Galeazzi et al. |

(56) References Cited

U.S. PATENT DOCUMENTS

| | | |
|---|---|---|
| 6,546,375 B1 | 4/2003 | Pang et al. |
| 6,578,147 B1 | 6/2003 | Shanklin et al. |
| 6,581,098 B1 | 6/2003 | Kumpf |
| 6,591,302 B2 | 7/2003 | Boucher et al. |
| 6,594,643 B1 | 7/2003 | Freeny, Jr. |
| 6,597,812 B1 | 7/2003 | Fallon et al. |
| 6,601,094 B1 | 7/2003 | Mentze et al. |
| 6,601,104 B1 | 7/2003 | Fallon |
| 6,604,158 B1 | 8/2003 | Fallon |
| 6,624,761 B2 | 9/2003 | Fallon |
| 6,625,150 B1 | 9/2003 | Yu |
| 6,691,301 B2 | 2/2004 | Bowen |
| 6,704,816 B1 | 3/2004 | Burke |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,820,129 B1 | 11/2004 | Courey, Jr. |
| 6,839,686 B1 | 1/2005 | Galant |
| 6,847,645 B1 | 1/2005 | Potter et al. |
| 6,850,906 B1 | 2/2005 | Chadha et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,944,168 B2 | 9/2005 | Paatela et al. |
| 6,978,223 B2 | 12/2005 | Milliken |
| 6,981,054 B1 | 12/2005 | Krishna |
| 7,003,488 B2 | 2/2006 | Dunne et al. |
| 7,024,384 B2 | 4/2006 | Daughtery, III |
| 7,046,848 B1 | 5/2006 | Olcott |
| 7,058,735 B2 | 6/2006 | Spencer |
| 7,065,475 B1 | 6/2006 | Brundobler |
| 7,089,206 B2 | 8/2006 | Martin |
| 7,089,326 B2 | 8/2006 | Boucher et al. |
| 7,093,023 B2 | 8/2006 | Lockwood et al. |
| 7,099,838 B1 | 8/2006 | Gastineau et al. |
| 7,103,569 B1 | 9/2006 | Groveman et al. |
| 7,117,280 B2 | 10/2006 | Vasudevan |
| 7,124,106 B1 | 10/2006 | Stallaert et al. |
| 7,127,424 B2 | 10/2006 | Kemp, II et al. |
| 7,130,913 B2 | 10/2006 | Fallon |
| 7,139,743 B2 | 11/2006 | Indeck et al. |
| 7,149,715 B2 | 12/2006 | Browne et al. |
| 7,161,506 B2 | 1/2007 | Fallon |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,212,998 B1 | 5/2007 | Muller et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |
| 7,257,842 B2 | 8/2007 | Barton et al. |
| 7,277,887 B1 | 10/2007 | Burrows et al. |
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,321,937 B2 | 1/2008 | Fallon |
| 7,356,498 B2 | 4/2008 | Kaminsky et al. |
| 7,363,277 B1 | 4/2008 | Dutta et al. |
| 7,378,992 B2 | 5/2008 | Fallon |
| 7,386,046 B2 | 6/2008 | Fallon et al. |
| 7,406,444 B2 | 7/2008 | Eng et al. |
| 7,417,568 B2 | 8/2008 | Fallon et al. |
| 7,454,418 B1 | 11/2008 | Wang |
| 7,457,834 B2 | 11/2008 | Jung et al. |
| 7,461,064 B2 | 12/2008 | Fontoura et al. |
| 7,478,431 B1 | 1/2009 | Nachenberg |
| 7,487,327 B1 | 2/2009 | Chang et al. |
| 7,496,108 B2 | 2/2009 | Biran et al. |
| 7,539,845 B1 | 5/2009 | Wentzlaff et al. |
| 7,558,753 B2 | 7/2009 | Neubert et al. |
| 7,558,925 B2 | 7/2009 | Bouchard et al. |
| 7,565,525 B2 | 7/2009 | Vorbach et al. |
| 7,580,719 B2 | 8/2009 | Karmarkar |
| 7,587,476 B2 | 9/2009 | Sato |
| 7,598,958 B1 | 10/2009 | Kelleher |
| 7,603,303 B1 | 10/2009 | Kraus et al. |
| 7,606,267 B2 | 10/2009 | Ho et al. |
| 7,606,968 B2 | 10/2009 | Branscome et al. |
| 7,617,291 B2 | 11/2009 | Fan et al. |
| 7,636,703 B2 | 12/2009 | Taylor |
| 7,660,761 B2 | 2/2010 | Zhou et al. |
| 7,668,849 B1 | 2/2010 | Narancic et al. |
| 7,685,121 B2 | 3/2010 | Brown et al. |
| 7,698,338 B2 | 4/2010 | Hinshaw et al. |
| 7,701,945 B2 | 4/2010 | Roesch et al. |
| 7,714,747 B2 | 5/2010 | Fallon |
| 7,715,436 B1 | 5/2010 | Eiriksson et al. |
| 7,760,733 B1 | 7/2010 | Eiriksson et al. |
| 7,761,459 B1 | 7/2010 | Zhang et al. |
| 7,788,293 B2 | 8/2010 | Pasztor et al. |
| 7,831,720 B1 | 11/2010 | Noureddine et al. |
| 7,840,482 B2 | 11/2010 | Singla et al. |
| 7,856,545 B2 | 12/2010 | Casselman |
| 7,856,546 B2 | 12/2010 | Casselman et al. |
| 7,908,213 B2 | 3/2011 | Monroe et al. |
| 7,908,259 B2 | 3/2011 | Branscome et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,991,667 B2 | 8/2011 | Kraus et al. |
| 8,015,099 B2 | 9/2011 | Reid |
| 8,024,253 B2 | 9/2011 | Peterffy et al. |
| 8,027,893 B1 | 9/2011 | Burrows et al. |
| 8,032,440 B1 | 10/2011 | Hait |
| 8,046,283 B2 | 10/2011 | Burns et al. |
| 8,069,102 B2 | 11/2011 | Indeck et al. |
| 8,073,763 B1 | 12/2011 | Merrin et al. |
| 8,095,508 B2 | 1/2012 | Chamberlain et al. |
| 8,131,697 B2 | 3/2012 | Indeck et al. |
| 8,140,416 B2 | 3/2012 | Borkovec et al. |
| 8,156,101 B2 | 4/2012 | Indeck et al. |
| 8,175,946 B2 | 5/2012 | Hamati et al. |
| 8,224,800 B2 | 7/2012 | Branscome et al. |
| 8,229,918 B2 | 7/2012 | Branscome et al. |
| 8,234,267 B2 | 7/2012 | Branscome et al. |
| 8,244,718 B2 | 8/2012 | Chamdani et al. |
| 8,326,819 B2 | 12/2012 | Indeck et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 8,660,925 B2 | 2/2014 | Borkovec et al. |
| 8,751,452 B2 | 6/2014 | Chamberlain et al. |
| 8,762,249 B2 | 6/2014 | Taylor et al. |
| 8,768,805 B2 | 7/2014 | Taylor et al. |
| 8,768,888 B2 | 7/2014 | Chamberlain et al. |
| 8,843,408 B2 | 9/2014 | Singla et al. |
| 8,880,501 B2 | 11/2014 | Indeck et al. |
| 8,880,551 B2 | 11/2014 | Hinshaw et al. |
| 9,020,928 B2 | 4/2015 | Indeck et al. |
| 9,047,243 B2 | 6/2015 | Taylor et al. |
| 9,166,597 B1 | 10/2015 | Denisenko et al. |
| 9,176,775 B2 | 11/2015 | Chamberlain et al. |

(56) References Cited

U.S. PATENT DOCUMENTS

| | | |
|---|---|---|
| 9,396,222 B2 | 7/2016 | Indeck et al. |
| 9,582,831 B2 | 2/2017 | Parsons et al. |
| 9,672,565 B2 | 6/2017 | Parsons et al. |
| 9,961,006 B1 | 5/2018 | Sutardja et al. |
| 10,037,568 B2 | 7/2018 | Taylor et al. |
| 10,062,115 B2 | 8/2018 | Taylor et al. |
| 10,121,196 B2 | 11/2018 | Parsons et al. |
| 10,191,974 B2 | 1/2019 | Indeck et al. |
| 10,229,453 B2 | 3/2019 | Taylor et al. |
| 10,572,824 B2 | 2/2020 | Chamberlain et al. |
| 10,650,452 B2 | 5/2020 | Parsons et al. |
| 10,909,623 B2 | 2/2021 | Indeck et al. |
| 10,929,152 B2 | 2/2021 | Chamberlain et al. |
| 10,957,423 B2 | 3/2021 | Buhler et al. |
| 10,963,962 B2 | 3/2021 | Parsons et al. |
| 2001/0003193 A1 | 6/2001 | Woodring et al. |
| 2001/0004354 A1 | 6/2001 | Jolitz |
| 2001/0005314 A1 | 6/2001 | Farooq et al. |
| 2001/0013048 A1 | 8/2001 | Imbert de Tremiolles et al. |
| 2001/0015753 A1 | 8/2001 | Myers |
| 2001/0015919 A1 | 8/2001 | Kean |
| 2001/0025315 A1 | 9/2001 | Jolitz |
| 2001/0042040 A1 | 11/2001 | Keith |
| 2001/0044770 A1* | 11/2001 | Keith ............... G06Q 40/04 705/37 |
| 2001/0047473 A1 | 11/2001 | Fallon |
| 2001/0056547 A1 | 12/2001 | Dixon |
| 2002/0010825 A1 | 1/2002 | Wilson |
| 2002/0019812 A1 | 2/2002 | Board et al. |
| 2002/0023010 A1 | 2/2002 | Rittmaster et al. |
| 2002/0038276 A1 | 3/2002 | Buhannic et al. |
| 2002/0049841 A1 | 4/2002 | Johnson et al. |
| 2002/0054604 A1 | 5/2002 | Kadambi et al. |
| 2002/0069375 A1 | 6/2002 | Bowen |
| 2002/0072893 A1 | 6/2002 | Wilson |
| 2002/0080871 A1 | 6/2002 | Fallon et al. |
| 2002/0082967 A1 | 6/2002 | Kaminsky et al. |
| 2002/0091826 A1 | 7/2002 | Comeau et al. |
| 2002/0095519 A1 | 7/2002 | Philbrick et al. |
| 2002/0100029 A1 | 7/2002 | Bowen |
| 2002/0101425 A1 | 8/2002 | Hamid |
| 2002/0105911 A1 | 8/2002 | Pruthi et al. |
| 2002/0119803 A1 | 8/2002 | Bitterlich et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0150248 A1 | 10/2002 | Kovacevic |
| 2002/0156998 A1 | 10/2002 | Casselman |
| 2002/0162025 A1 | 10/2002 | Sutton et al. |
| 2002/0166063 A1 | 11/2002 | Lachman et al. |
| 2002/0169873 A1 | 11/2002 | Zodnik |
| 2002/0180742 A1 | 12/2002 | Hamid |
| 2002/0198813 A1 | 12/2002 | Patterson et al. |
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0041129 A1 | 2/2003 | Appleby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0061409 A1 | 3/2003 | RuDusky |
| 2003/0065607 A1 | 4/2003 | Satchwell |
| 2003/0065943 A1 | 4/2003 | Geis et al. |
| 2003/0069723 A1 | 4/2003 | Hegde |
| 2003/0074177 A1 | 4/2003 | Bowen |
| 2003/0074489 A1 | 4/2003 | Steger et al. |
| 2003/0074582 A1 | 4/2003 | Patel et al. |
| 2003/0078865 A1 | 4/2003 | Lee |
| 2003/0079060 A1 | 4/2003 | Dunlop |
| 2003/0086300 A1 | 5/2003 | Noyes et al. |
| 2003/0093343 A1 | 5/2003 | Huttenlocher et al. |
| 2003/0093347 A1 | 5/2003 | Gray |
| 2003/0097481 A1 | 5/2003 | Richter |
| 2003/0099254 A1 | 5/2003 | Richter |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0115485 A1 | 6/2003 | Milliken |
| 2003/0117971 A1 | 6/2003 | Aubury |
| 2003/0120460 A1 | 6/2003 | Aubury |
| 2003/0121010 A1 | 6/2003 | Aubury |
| 2003/0126065 A1 | 7/2003 | Eng et al. |
| 2003/0130899 A1 | 7/2003 | Ferguson et al. |
| 2003/0140337 A1 | 7/2003 | Aubury |
| 2003/0154284 A1 | 8/2003 | Bernardin et al. |
| 2003/0154368 A1 | 8/2003 | Stevens et al. |
| 2003/0163715 A1 | 8/2003 | Wong |
| 2003/0167348 A1 | 9/2003 | Greenblat |
| 2003/0172017 A1 | 9/2003 | Feingold et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0208430 A1 | 11/2003 | Gershon |
| 2003/0217306 A1 | 11/2003 | Harthcock et al. |
| 2003/0221013 A1 | 11/2003 | Lockwood et al. |
| 2003/0233302 A1 | 12/2003 | Weber et al. |
| 2004/0000928 A1 | 1/2004 | Cheng et al. |
| 2004/0015502 A1 | 1/2004 | Alexander et al. |
| 2004/0015633 A1 | 1/2004 | Smith |
| 2004/0019703 A1 | 1/2004 | Burton |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0059666 A1 | 3/2004 | Waelbroeck et al. |
| 2004/0062245 A1 | 4/2004 | Sharp et al. |
| 2004/0064737 A1 | 4/2004 | Milliken et al. |
| 2004/0073703 A1 | 4/2004 | Boucher et al. |
| 2004/0111632 A1 | 6/2004 | Halperin |
| 2004/0123258 A1 | 6/2004 | Butts |
| 2004/0162826 A1 | 8/2004 | Wyschogrod et al. |
| 2004/0170070 A1 | 9/2004 | Rapp et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0199448 A1 | 10/2004 | Chalermkraivuth et al. |
| 2004/0199452 A1 | 10/2004 | Johnston et al. |
| 2004/0205149 A1 | 10/2004 | Dillon et al. |
| 2005/0005145 A1 | 1/2005 | Teixeira |
| 2005/0027634 A1 | 2/2005 | Gershon |
| 2005/0033672 A1 | 2/2005 | Lasry et al. |
| 2005/0038946 A1 | 2/2005 | Borden |
| 2005/0044344 A1 | 2/2005 | Stevens |
| 2005/0074033 A1* | 4/2005 | Chauveau ............... G06Q 30/08 370/503 |
| 2005/0080649 A1 | 4/2005 | Alvarez et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0111363 A1 | 5/2005 | Snelgrove et al. |
| 2005/0131790 A1 | 6/2005 | Benzschawel et al. |
| 2005/0135608 A1 | 6/2005 | Zheng |

(56) References Cited

U.S. PATENT DOCUMENTS

| | | |
|---|---|---|
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0190787 A1 | 9/2005 | Kuik et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0228735 A1 | 10/2005 | Duquette |
| 2005/0229254 A1 | 10/2005 | Singh et al. |
| 2005/0240510 A1 | 10/2005 | Schweickert et al. |
| 2005/0243824 A1 | 11/2005 | Abbazia et al. |
| 2005/0267836 A1 | 12/2005 | Crosthwaite et al. |
| 2005/0283423 A1 | 12/2005 | Moser et al. |
| 2005/0283743 A1 | 12/2005 | Mulholland et al. |
| 2006/0020536 A1 | 1/2006 | Renton et al. |
| 2006/0020715 A1 | 1/2006 | Jungck |
| 2006/0026090 A1 | 2/2006 | Balabon |
| 2006/0031154 A1 | 2/2006 | Noviello et al. |
| 2006/0031156 A1 | 2/2006 | Noviello et al. |
| 2006/0047636 A1 | 3/2006 | Mohania et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0123425 A1 | 6/2006 | Ramarao et al. |
| 2006/0129745 A1 | 6/2006 | Thiel et al. |
| 2006/0143099 A1 | 6/2006 | Partlow et al. |
| 2006/0146991 A1 | 7/2006 | Thompson et al. |
| 2006/0215691 A1 | 9/2006 | Kobayashi et al. |
| 2006/0242123 A1 | 10/2006 | Williams |
| 2006/0259407 A1 | 11/2006 | Rosenthal et al. |
| 2006/0259417 A1 | 11/2006 | Marynowski et al. |
| 2006/0269148 A1 | 11/2006 | Farber et al. |
| 2006/0282281 A1 | 12/2006 | Egetoft |
| 2006/0282369 A1 | 12/2006 | White |
| 2006/0294059 A1 | 12/2006 | Chamberlain et al. |
| 2007/0011183 A1 | 1/2007 | Langseth et al. |
| 2007/0011687 A1 | 1/2007 | Ilik et al. |
| 2007/0025351 A1 | 2/2007 | Cohen |
| 2007/0061231 A1 | 3/2007 | Kim-E |
| 2007/0061241 A1 | 3/2007 | Jovanovic et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112837 A1 | 5/2007 | Houh et al. |
| 2007/0118457 A1 | 5/2007 | Peterffy et al. |
| 2007/0118494 A1 | 5/2007 | Jannarone et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0174841 A1 | 7/2007 | Chamberlain et al. |
| 2007/0179935 A1 | 8/2007 | Lee et al. |
| 2007/0198523 A1 | 8/2007 | Hayim |
| 2007/0209068 A1 | 9/2007 | Ansari et al. |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0260814 A1 | 11/2007 | Branscome et al. |
| 2007/0277036 A1 | 11/2007 | Chamberlain et al. |
| 2007/0294157 A1 | 12/2007 | Singla et al. |
| 2007/0294162 A1 | 12/2007 | Borkovec |
| 2008/0077793 A1 | 3/2008 | Tan et al. |
| 2008/0082502 A1 | 4/2008 | Gupta |
| 2008/0084573 A1 | 4/2008 | Horowitz et al. |
| 2008/0086274 A1 | 4/2008 | Chamberlain et al. |
| 2008/0097893 A1* | 4/2008 | Walsky ............... G06Q 30/0601 705/37 |
| 2008/0104542 A1 | 5/2008 | Cohen et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126274 A1 | 5/2008 | Jannarone et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0162378 A1 | 7/2008 | Levine et al. |
| 2008/0175239 A1 | 7/2008 | Sistanizadeh et al. |
| 2008/0183688 A1 | 7/2008 | Chamdani et al. |
| 2008/0189251 A1 | 8/2008 | Branscome et al. |
| 2008/0189252 A1 | 8/2008 | Branscome et al. |
| 2008/0243675 A1 | 10/2008 | Parsons et al. |
| 2008/0275805 A1 | 11/2008 | Hecht |
| 2009/0019219 A1 | 1/2009 | Magklis et al. |
| 2009/0182683 A1 | 7/2009 | Taylor et al. |
| 2009/0262741 A1 | 10/2009 | Jungck et al. |
| 2009/0287628 A1 | 11/2009 | Indeck et al. |
| 2010/0005036 A1 | 1/2010 | Kraus et al. |
| 2010/0027545 A1 | 2/2010 | Gomes et al. |
| 2010/0082895 A1 | 4/2010 | Branscome et al. |
| 2010/0106976 A1 | 4/2010 | Aciicmez et al. |
| 2010/0198920 A1 | 8/2010 | Wong et al. |
| 2010/0257537 A1 | 10/2010 | Hinshaw et al. |
| 2010/0306479 A1 | 12/2010 | Ezzat |
| 2011/0029471 A1 | 2/2011 | Chakradhar et al. |
| 2011/0040701 A1 | 2/2011 | Singla et al. |
| 2011/0040776 A1 | 2/2011 | Najm et al. |
| 2011/0066832 A1 | 3/2011 | Casselman et al. |
| 2011/0125960 A1 | 5/2011 | Casselman |
| 2011/0145130 A1 | 6/2011 | Glodjo et al. |
| 2011/0167083 A1 | 7/2011 | Branscome et al. |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2011/0218987 A1 | 9/2011 | Branscome et al. |
| 2011/0231446 A1 | 9/2011 | Buhler et al. |
| 2011/0246353 A1 | 10/2011 | Kraus et al. |
| 2011/0252008 A1 | 10/2011 | Chamberlain et al. |
| 2011/0289230 A1 | 11/2011 | Ueno |
| 2011/0295967 A1 | 12/2011 | Wang et al. |
| 2012/0065956 A1* | 3/2012 | Irturk ..................... G06F 30/30 703/21 |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0130922 A1 | 5/2012 | Indeck et al. |
| 2012/0179590 A1 | 7/2012 | Borkovec et al. |
| 2012/0215801 A1 | 8/2012 | Indeck et al. |
| 2012/0246052 A1 | 9/2012 | Taylor et al. |
| 2013/0007000 A1 | 1/2013 | Indeck et al. |
| 2013/0086096 A1 | 4/2013 | Indeck et al. |
| 2013/0159449 A1 | 6/2013 | Taylor et al. |
| 2013/0262287 A1 | 10/2013 | Parsons et al. |
| 2013/0290163 A1 | 10/2013 | Parsons et al. |
| 2014/0025656 A1 | 1/2014 | Indeck et al. |
| 2014/0040109 A1 | 2/2014 | Parsons et al. |
| 2014/0067830 A1 | 3/2014 | Buhler et al. |
| 2014/0089163 A1 | 3/2014 | Parsons et al. |
| 2014/0164215 A1 | 6/2014 | Parsons et al. |
| 2014/0180903 A1 | 6/2014 | Parsons et al. |
| 2014/0180904 A1 | 6/2014 | Parsons et al. |
| 2014/0180905 A1 | 6/2014 | Parsons et al. |
| 2014/0181133 A1 | 6/2014 | Parsons et al. |
| 2014/0310148 A1 | 10/2014 | Taylor et al. |
| 2014/0310717 A1 | 10/2014 | Chamberlain et al. |

(56) References Cited

U.S. PATENT DOCUMENTS

| | | | |
|---|---|---|---|
| 2016/0070583 | A1 | 3/2016 | Chamberlain et al. |
| 2016/0328470 | A1 | 11/2016 | Indeck et al. |
| 2017/0102950 | A1 | 4/2017 | Chamberlain et al. |
| 2017/0124255 | A1 | 5/2017 | Buhler et al. |
| 2019/0155831 | A1 | 5/2019 | Indeck et al. |
| 2019/0205975 | A1 | 7/2019 | Taylor et al. |
| 2019/0324770 | A1 | 10/2019 | Chamberlain et al. |
| 2021/0142218 | A1 | 5/2021 | Chamberlain et al. |
| 2021/0200559 | A1 | 7/2021 | Chamberlain et al. |
| 2021/0304848 | A1 | 9/2021 | Buhler et al. |

FOREIGN PATENT DOCUMENTS

| | | | |
|---|---|---|---|
| EP | 0851358 | A | 7/1998 |
| EP | 0887723 | | 12/1998 |
| EP | 0911738 | A | 4/1999 |
| JP | 09145544 | A | 6/1997 |
| JP | 09-269901 | A | 10/1997 |
| JP | 11-259559 | A | 9/1999 |
| JP | 11282912 | | 10/1999 |
| JP | 11316765 | A | 11/1999 |
| JP | 2000286715 | A | 10/2000 |
| JP | 2001268071 | A | 9/2001 |
| JP | 2001283000 | A | 10/2001 |
| JP | 2002101089 | A | 4/2002 |
| JP | 2002269343 | A | 9/2002 |
| JP | 2002352070 | A | 12/2002 |
| JP | 2003-036360 | A | 2/2003 |
| JP | 2003256660 | A | 9/2003 |
| JP | 2006059203 | A | 3/2006 |
| JP | 2006293852 | A | 10/2006 |
| JP | 1180644 | B1 | 11/2008 |
| JP | 2010-530591 | A | 9/2010 |
| WO | 199010910 | | 9/1990 |
| WO | 199409443 | A1 | 4/1994 |
| WO | 199737735 | | 10/1997 |
| WO | 2000041136 | A1 | 7/2000 |
| WO | 2001022425 | A | 3/2001 |
| WO | 0135216 | A2 | 5/2001 |
| WO | 200172106 | A2 | 10/2001 |
| WO | 2001080082 | A2 | 10/2001 |
| WO | 2001080558 | | 10/2001 |
| WO | 0190890 | A1 | 11/2001 |
| WO | 2002061525 | | 8/2002 |
| WO | 2003100650 | | 4/2003 |
| WO | 2003036845 | | 5/2003 |
| WO | 2003100662 | | 12/2003 |
| WO | 2004017604 | | 2/2004 |
| WO | 2004042560 | A | 5/2004 |
| WO | 2004042561 | A | 5/2004 |
| WO | 2004042562 | | 5/2004 |
| WO | 2004042574 | A | 5/2004 |
| WO | 2005017708 | A | 2/2005 |
| WO | 2005026925 | | 3/2005 |
| WO | 2005048134 | A | 5/2005 |
| WO | 2006023948 | | 3/2006 |
| WO | 2006096324 | | 9/2006 |
| WO | 2007064685 | | 6/2007 |
| WO | 2007/074903 | A1 | 7/2007 |
| WO | 2007087507 | | 8/2007 |
| WO | 2007/127336 | A2 | 11/2007 |
| WO | 2008022036 | | 2/2008 |
| WO | 2009089467 | A2 | 7/2009 |
| WO | 2009140363 | A1 | 11/2009 |
| WO | 2010/077829 | | 7/2010 |

OTHER PUBLICATIONS

"A Reconfigurable Computing Model for Biological Research Application of Smith-Waterman Analysis to Bacterial Genomes" A White Paper Prepared by Star Bridge Systems, Inc. [retrieved Dec. 12, 2006], Retrieved from the Internet: <URL: http://www.starbridgesystems.com/resources/whitepapers/Smith%20Waterman%20Whitepaper.pdf.
"ACTIV Financial Announces Hardware Based Market Data Feed Processing Strategy", For Release on Apr. 2, 2007, 2 pages.
"ACTIV Financial Delivers Accelerated Market Data Feed", Apr. 6, 2007, byline of Apr. 2, 2007, downloaded from http://hpcwire.com/hpc.1346816.html on Jun. 19, 2007, 3 pages.
"DRC, Exegy Announce Joint Development Agreement", Jun. 8, 2007, byline of Jun. 4, 2007; downloaded from http://www.hpcwire.com/hpc/1595644.html on Jun. 19, 2007, 3 pages.
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.
"Overview, Field Programmable Port Extender", Jan. 2002 GigabitWorkshop Tutorial, Washington University, St. Louis, MO, Jan. 3-4, 2002, pp. 1-4.
"Payload Plus™ Agere System Interface", Agere Systems Product Brief, Jun. 2001, downloaded from Internet, Jan. 2002, pp. 1-6.
"RFC793: Transmission Control Protocol, Darpa Internet Program, Protocol Specification", Sep. 1981.
"Technology Overview", Data Search Systems Incorporated, downloaded from the http://www.datasearchsystems.com/tech.htm on Apr. 19, 2004.
"The Field-Programmable Port Extender (FPX)", downloaded from http://www.arl.wustl.edu/arl/ in Mar. 2002.
Aldwairi et al., "Configurable String Matching Hardware for Speeding up Intrusion Detection", SIRARCH Comput. Archit. News, vol. 33, No. 1, pp. 99-107, Mar. 2005.
Amanuma et al., "A FPGA Architecture For High Speed Computation", Proceedings of 60th Convention Architecture, Software Science, Engineering, Mar. 14, 2000, pp. 1-163-1-164, Information Processing Society, Japan.
Anerousis et al., "Using the AT&T Labs Packetscope for Internet Measurement, Design, and Performance Analysis", Network and Distributed Systems Research Laboratory, AT&T Labs-Research, Florham, Park, NJ, Oct. 1997.
Anonymous, "Method for Allocating Computer Disk Space to a File of Known Size", IBM Technical Disclosure Bulletin, vol. 27, No. 10B, Mar. 1, 1985, New York.
Arnold et al., "The Splash 2 Processor and Applications", Proceedings 1993 IFFF International Conference on Computer Design: VLSI In Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.
Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.
Barone-Adesi et al., "Efficient Analytic Approximation of American Option Values", Journal of Finance, vol. 42, No. 2 (Jun. 1987), pp. 301-320.
Batory, "Modeling the Storage Architectures of Commercial Database Systems", ACM Transactions on Database Systems, Dec. 1985, pp. 463-528, vol. 10, issue 4.
Behrens et al., "BLASTN Redundancy Filter in Reprogrammable Hardware," Final Project Submission, Fall 2003, Department of Computer Science and Engineering, Washington University.

(56) References Cited

OTHER PUBLICATIONS

Berk, "JLex: A lexical analyzer generator for Java™", downloaded from http://www.cs.princeton.edu/~appel/modern/ava/Jlex/ in Jan. 2002, pp. 1-18.

Bianchi et al., "Improved Queueing Analysis of Shared Buffer Switching Networks", ACM, Aug. 1993, pp. 482-490.

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.

Braun et al., "Protocol Wrappers for Layered Network Packet Processing in Reconfigurable Hardware", IEEE Micro, Jan.-Feb. 2002, pp. 66-74.

Brodie et al., "Dynamic Reconfigurable Computing", in Proc. of 9th Military and Aerospace Programmable Logic Devices International Conference, Sep. 2006.

Cavnar et al., "N-Gram-Based Text Categorization", Proceedings of SDAIR-94, 3rd Annual Symposium on Document Analysis and Information Retrieval, Las Vegas, pp. 161-175, 1994.

Celko, "Joe Celko's Data & Databases: Concepts in Practice", 1999, pp. 72-74, Morgan Kaufmann Publishers.

Chamberlain et al., "Achieving Real Data Throughput for an FPGA Co-Processor on Commodity Server Platforms", Proc, of 1st Workshop on Building Block Engine Architectures for Computers and Networks, Oct. 2004, Boston, MA.

Chamberlain et al., "The Mercury System: Embedding Computation Into Disk Drives", 7th High Performance Embedded Computing Workshop, Sep. 2003, Boston, MA.

Chamberlain et al., "The Mercury System: Exploiting Truly Fast Hardware for Data Search", Proc. of Workshop on Storage Network Architecture and Parallel I/Os, Sep. 2003, New Orleans, LA.

Cho et al., "Deep Packet Filter with Dedicated Logic and Read Only Memories", 12th Annual IEEE Symposium on Field-Programmable Custom Computing Machines, Apr. 2004.

Choi et al., "Design of a Flexible Open Platform for High Performance Active Networks", Allerton Conference, 1999, Champaign, IL.

Cholleti, "Storage Allocation in Bounded Time", MS Thesis, Dept. of Computer Science and Engineering, Washington Univeristy, St. Louis, MO (Dec. 2002). Available as Washington University Technical Report WUCSE-2003-2.

Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton et al., "Configurable Computing: A Survey of Systems and Software", Technical Report, Northwestern University, Dept. of ECE, 1999.

Compton et al., "Reconfigurable Computing: A Survey of Systems and Software", Technical Report, Northwestern University, Dept. of ECE, 1999, presented by Yi-Gang Tai.

Compton et al., "Reconfigurable Computing: A Survey of Systems and Software", University of Washington, ACM Computing Surveys, Jun. 2, 2002, pp. 171-210, vol. 34 No. 2, <http://www.idi.ntnu.no/emner/tdt22/2011/reconfig.pdf>.

Cong et al., "An Optional Technology Mapping Algorithm for Delay Optimization in Lookup-Table Based FPGA Designs", IEEE, 1992, pp. 48-53.

Corbet et al., Linux Device Drivers: Where the Kernel Meets the Hardware, O'Reilly, Feb. 2005, pp. 19-20, 412-414, and 441, 3rd Edition.

Crosman, "Who Will Cure Your Data Latency?", Storage & Servers, Jun. 20, 2007, URL: http://www.networkcomputing.com/article/printFullArticleSrc.jhtml?article ID=199905630.

Cuppu and Jacob, "Organizational Design Trade-Offs at the DRAM, Memory Bus and Memory Controller Level Initial Results," Technical Report UMB-SCA-1999-2, Univ. of Maryland Systems & Computer Architecture Group, Nov. 1999, pp. 1-10.

Currid, "TCP Offload to the Rescue", Networks, Jun. 14, 2004, 16 pages, vol. 2, No. 3.

Shirazi et al., "Quantitative Analysis of FPGA-based Database Searching", Journal of VLSI Signal Processing Systems For Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Singh et al., "The EarlyBird System for Real-Time Detection on Unknown Worms", Technical report CS2003-0761, Aug. 2003.

Skiena et al., "Programming Challenges: The Programming Contest Training Manual", 2003, pp. 30-31, Springer.

Sourdis and Pnevmatikatos, "Fast, Large-Scale String Match for a 10Gbps FPGA-based Network Intrusion Detection System", 13th International Conference on Field Programmable Logic and Applications, 2003.

Steinbach et al., "A Comparison of Document Clustering Techniques", KDD Workshop on Text Mining, 2000.

Tan et al., "A High Throughput String Matching Architecture for Intrusion Detection and Prevention", ISCA 2005: 32nd Annual International Symposium on Computer Architecture, pp. 112-122, 2005.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions For Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the

(56) References Cited

OTHER PUBLICATIONS

Internet: <URL: http://www.starbridgesystems.com/resources/whitepapers/Dynamically%20Reconfigurable%20Computing.pdf.
Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.
West et al., "An FPGA-Based Search Engine for Unstructured Database", Proc. of 2nd Workshop on Application Specific Processors, Dec. 2003, San Diego, CA.
Wooster et al., "HTTPDUMP Network HTTP Packet Snooper", Apr. 25, 1996.
Worboys, "GIS: A Computing Perspective", 1995, pp. 245-247, 287, Taylor & Francis Ltd.
Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.
Yan et al., "Enhancing Collaborative Spam Detection with Bloom Filters", 2006, IEEE, pp. 414-425.
Yoshitani et al., "Performance Evaluation of Parallel Volume Rendering Machine Re Volver/C40", Study Report of Information Processing Society, Mar. 5, 1999, pp. 79-84, vol. 99, No. 21.
Ziv et al., "A Universal Algorithm for Sequential Data Compression", IEEE Trans. Inform. Theory, IT-23(3): 337-343 (1997).
Denoyer et al., "HMM-based Passage Models for Document Classification and Ranking", Proceedings of ECIR-01, 23rd European Colloquim Information Retrieval Research, Darmstatd, DE, pp. 126-135, 2001.
Dharmapurikar et al., "Deep Packet Inspection Using Parallel Bloom Filters," IEEE Micro, Jan.-Feb., 2004, vol. 24, Issue: 1, pp. 52-61.
Dharmapurikar et al., "Deep Packet Inspection Using Parallel Bloom Filters," Symposium on High Performance nterconnects (Hotl), Stanford, California, 2003, pp. 44-51.
Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.
Dharmapurikar, "Fast and Scalable Pattern Matching for Content Filtering", ACM, ANCS 05, 2005, pp. 183-192.
Ebeling et al., "RaPiD—Reconfigurable Pipelined Datapath", University of Washington, Dept. of Computer Science and Engineering, Sep. 23, 1996, Seattle, WA.
Exegy Inc., "Exegy and HyperFeed to Unveil Exelerate TP at SIA Conference", Release Date: Jun. 20, 2006, downloaded from http://news.thomasnet.com/companystory/488004 on Jun. 19, 2007, 4 pages.
Exegy Inc., "First Exegy Ticker Plant Deployed", Release Date: Oct. 17, 2006, downloaded from http://news.thomasnet.com/companystory/496530 on Jun. 19, 2007, 5 pages.
Extended European Search Report for EP Application 11847815.5 dated Apr. 4, 2014.
Feldman, "High Frequency Traders Get Boost From FPGA Acceleration", Jun. 8, 2007, downloaded from http://www.hpcwire.com/hpc.1600113.html on Jun. 19, 2007, 4 pages.
Franklin et al., "An Architecture for Fast Processing of Large Unstructured Data Sets." Proc. of 22nd Int'l Conf. on Computer Design, Oct. 2004, pp. 280-287.
Franklin et al., "Assisting Network Intrusion Detection with Reconfigurable Hardware", Symposium on Field-Programmable Custom Computing Machines (FCCM 2002), Apr. 2002, Napa, California.
Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.
Gavrila et al., "Multi-feature Hierarchical Template Matching Using Distance Transforms", IEEE, Aug. 16-20, 1998, vol. 1, pp. 439-444.
Gokhale et al., "Reconfigurable Computing: Accelerating Computation With Field-Programmable Gate Arrays", 2005, pp. 1-3, 7, 11-15, 39, 92-93, Springer.
Gokhale et al., "Reconfigurable Computing: Accelerating Computation with Field-Programmable Gate Arrays", Springer, 2005, pp. 1-36.
Gokhale et al., "Reconfigurable Computing: Accelerating Computation with Field-Programmable Gate Arrays", Springer, 2005, pp. 1-54, 92-96.
Google Search Results Page for "field programmable gate array financial calculation stock market" over dates of Jan. 1, 1990-May 21, 2002, 1 page.
Gunther et al., "Assessing Document Relevance with Run-Time Reconfigurable Machines", IEEE Symposium on FPGAs for Custom Computing Machines, 1996, pp. 10-17, Proceedings, Napa Valley, CA.
Gupta et al., "High-Speed Implementations of Rule-Based Systems," ACM Transactions on Computer Systems, May 1989, pp. 119-146, vol. 7, Issue 2.
Gupta et al., "Packet Classification on Multiple Fields", Computer Systems Laboratory, Stanford University, Stanford, CA.
Gupta et al., "PMM: A Parallel Architecture for Production Systems," Proceedings of the IEEE, Apr. 1992, pp. 693-696, vol. 2.
Gyang, "NCBI BLASTN Stage 1 in Reconfigurable Hardware," Technical Report WUCSE-2005-30, Aug. 2004, Department of Computer Science and Engineering, Washington University, St. Louis, MO.
Halaas et al., "A Recursive MISD Architecture for Pattern Matching", IEEE Transactions on Very Large Scale Integration, vol. 12, No. 7, pp. 727-734, Jul. 2004.
Harris, "Pete's Blog: Can FPGAs Overcome the FUD?", Low-Latency.com, May 14, 2007, URL: http://www.a-teamgroup.com/article/pete-blog-can-fpgas-overcome-the-fud/.
Hauck et al., "Software Technologies for Reconfigurable Systems", Northwestern University, Dept. of ECE, Technical Report, 1996.
Hayes, "Computer Architecture and Organization", Second Edition, 1988, pp. 448-459, McGraw-Hill, Inc.
Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.
Hirsch, "Tech Predictions for 2008", Reconfigurable Computing, Jan. 16, 2008, URL: http://fpgacomputing.blogspot.com/2008_01_01_archive.html.
Hoinville, et al. "Spatial Noise Phenomena of Longitudinal Magnetic Recording Media", IEEE Transactions on Magnetics, vol. 28, No. 6, Nov. 1992.
Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Howe, Data Analysis for Database Design Third Edition, 2001, 335 pages, Butterworth-Heinemann.
Hutchings et al., "Assisting Network Intrusion Detection with Reconfigurable Hardware", FCCM 2002: 10th Annual IEEE Symposium on Field-Programmable Custom Computing Machines, 2002.
Ibrahim et al., "Lecture Notes in Computer Science: Database and Expert Systems Applications", 2000, p. 769, vol. 1873, Springer.
International Preliminary Report on Patentability (Chapter I) for PCT/US2011/064269 dated Jun. 12, 2013.
International Search Report and Written Opinion for PCT/US2011/064269 dated Apr. 20, 2012.
Jacobson et al., "RFC 1072: TCP Extensions for Long-Delay Paths", Oct. 1988.
Jacobson et al., "tcpdump—dump traffic on a network", Jun. 30, 1997, online at www.cse.cuhk.edu.hk/~cslui/CEG4430/tcpdump.ps.gz.

(56) References Cited

OTHER PUBLICATIONS

Johnson et al., "Pattern Matching in Reconfigurable Logic for Packet Classification", College of Computing, Georgia Institute of Technology, Atlanta, GA.
Jones et al., "A Probabilistic Model of Information Retrieval: Development and Status", Information Processing and Management, Aug. 1998, 76 pages.
Keutzer et al., "A Survey of Programmable Platforms—Network Proc", University of California-Berkeley, pp. 1-29.
Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.
Krishnamurthy et al., "Biosequence Similarity Search On The Mercury System", Proceedings of the 15th IEEE International Conference on Application-Specific Systems, Architectures, and Processors (ASAP04), Sep. 2004, pp. 365-375.
Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.
Li et al., "Large-Scale IP Traceback in High-Speed Internet: Practical Techniques and Theoretical Foundation", Proceedings of the 2004 IEEE Symposium on Security and Privacy, 2004, pp. 1-15.
Lin et al., "Real-Time Image Template Matching Based on Systolic Array Processor", International Journal of Electronics; Dec. 1, 1992; pp. 1165-1176; vol. 73, No. 6; London, Great Britain.
Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.
Lockwood et al., "Hello, World: A Simple Application for the Field Programmable Port Extender (FPX)", Washington University, Department of Computer Science, Technical Report WUCS-00-12, Jul. 11, 2000.
Lockwood et al., "Parallel FPGA Programming over Backplane Chassis", Washington University, Department of Computer Science, Technical Report WUCS-00-11, Jun. 12, 2000.
Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.
Lockwood, "An Open Platform for Development of Network Processing Modules in Reprogrammable Hardware", IEC DesignCon 2001, Santa Clara, CA, Jan. 2001, Paper WB-19.
Lockwood, "Building Networks with Reprogrammable Hardware", Field Programmable Port Extender: Jan. 2002 Gigabit Workshop Tutorial, Washington University, St. Louis, MO, Jan. 3-4, 2002.
Lockwood, "Evolvable Internet Hardware Platforms", NASA/DoD Workshop on Evolvable Hardware (EHW'01), Long Beach, CA, Jul. 12-14, 2001, pp. 271-279.
Lockwood, "Hardware Laboratory Configuration", Field Programmable Port Extender: Jan. 2002 Gigabit Workshop Tutorial, Washington University, St Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Lockwood, "Protocol Processing on the FPX", Field Programmable Port Extender: Jan. 2002 Gigabit Workshop Tutorial, Washington University, St. Louis, MO, Jan. 3-4, 2002.
Lockwood, "Simulation and Synthesis", Field Programmable Port Extender: Jan. 2002 Gigabit Workshop Tutorial, Washington University, St. Louis, MO, Jan. 3-4, 2002.
Lockwood, "Simulation of the Hello World Application for the Field-Programmable Port Extender (FPX)", Washington University, Applied Research Lab, Spring 2001 Gigabits Kits Workshop.
Madhusudan, "Design of a System for Real-Time Worm Detection", Hot Interconnects, pp. 77-83, Stanford, CA, Aug. 2004, found at http://www hoti.org/hoti12/program/papers/2004/paper4.2.pdf.
Madhusudan, "Design of a System for Real-Time Worm Detection", Power Point Presentation in Support of Master's Thesis, Washington Univ., Dept. of Computer Science and Engineering, St. Louis, MO, Aug. 2004.
Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.
Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.
Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.
Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.
Motwani et al., "Randomized Algorithms", 1995, pp. 215-216, Cambridge University Press.
Mueller, "Upgrading and Repairing PCs, 15th Anniversary Edition", 2004, pp. 63-66, 188, Que.
Navarro, "A Guided Tour to Approximate String Matching", ACM Computing Surveys, vol. 33, No. 1, Mar. 2001, pp. 31-88.
Nunez et al., "The X-MatchLITE FPGA-Based Data Compressor", Euromicro Conference 1999, Proceedings, Italy, Sep. 8-10, 1999, pp. 126-132, Los Alamitos, CA.
Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.
Office Action for EP Application 11847815.5 dated Dec. 22, 2016.
Office Action for JP Application 2013-543394 dated Nov. 16, 2015.
Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.
Prosecution History for U.S. Appl. No. 11/765,306, now U.S. Pat. No. 7921046, filed Jun. 19, 2007.
Prosecution History for U.S. Appl. No. 13/076,968, filed Mar. 31, 2011 (Parsons et al.).
Ramakrishna et al., "A Performance Study of Hashing Functions for Hardware Applications", Int. Conf. on Computing and Information, May 1994, pp. 1621-1636, vol. 1, No. 1.
Ramakrishna et al., "Efficient Hardware Hashing Functions for High Performance Computers", IEEE Transactions on Computers, Dec. 1997, vol. 46, No. 12.
Ratha et al., "Convolution on Splash 2", Proceedings of IEEE Symposium on FPGAS for Custom Computing Machines, Apr. 19, 1995, pp. 204-213, Los Alamitos, California.
Response to Extended European Search Report for EP Applicaion 11847815.5 dated Apr. 4, 2014.
Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.
Russ et al., Non-Intrusive Built-In Self-Test for FPGA and MCM Applications, Aug. 8-10, 1995, IEEE, 480-485.
Sachin Tandon, "A Programmable Architecture for Real-Time Derivative Trading", Master's Thesis, University of Edinburgh, 2003.
Schmerken, "With Hyperfeed Litigation Pending, Exegy Launches Low-Latency Ticker Plant", in Wall Street & Technology Blog, Mar. 20, 2007, pp. 1-2.
Schmit, "Incremental Reconfiguration for Pipelined Applications", FPGAs for Custom Computing Machines, Proceedings, The 5th

(56) References Cited

OTHER PUBLICATIONS

Annual IEEE Symposium, Dept. of ECE, Carnegie Mellon University, Apr. 16-18, 1997, pp. 47-55, Pittsburgh, PA.
Schuehler et al., "Architecture for a Hardware Based, TCP/IP Content Scanning System", IEEE Micro, 24(1):62-69, Jan.-Feb. 2004, USA.
Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.
Seki et al., "High Speed Computation of Shogi With FPGA", Proceedings of 58th Convention Architecture, Software Science, Engineering, Mar. 9, 1999, pp. 1-133-1-134.
Shah, "Understanding Network Processors", Version 1.0, University of California-Berkeley, Sep. 4, 2001.
Shalunov et al., "Bulk TCP Use and Performance on Internet 2", ACM SIGCOMM Internet Measurement Workshop, 2001.
Shasha et al., "Database Tuning", 2003, pp. 280-284, Morgan Kaufmann Publishers.
Office Action for CA Application 2820898 dated Aug. 20, 2018.
Office Action for EP Application 11847815.5 dated Dec. 21, 2018.
Prosecution History for U.S. Appl. No. 13/316,332, now U.S. Pat. No. 10,037,568, filed Dec. 9, 2011.
Office Action for EP Application 11847815.5 dated Feb. 6, 2020.
OrCAD unveils strategy for leadership of mainstream programmable logic design market; strategy includes partnerships and a next generation product, OrCAD express for windows: A shrink-wrapped 32-bit windows application that includes VHDL simulation and synthesis. (Jun. 3, 1996). Retrieved Sep. 16, 2020 (Year: 1996).
Smith, E. (Oct. 10, 1994). QuickLogic QuickWorks guarantees fastest FPGA design cycle. Business Wire Retrieved from https://dialog.proquest.com/professional/docview/447031280?accountid=131444 <https://dialog.proquest.com/?professional/docview/447031280?accountid=131444> retrieved Sep. 16, 2020 (Year: 1994).
Diniz et al., "Data Search and Reorganization Using FPGAs: Application to Spatial Pointer-Based Data Structures", IEEE, 2003, 11 pgs.
Summons to Attend Oral Proceedings for EP Application 11847815.5 dated Sep. 29, 2021.
Villasenor et al., "The Flexibility of Configurable Computing", IEEE, 1998, pp. 67-84.
Vuillemin et al., "Programmable Active Memories: Reconfigurable Systems Come of Age", IEEE, 1996, pp. 56-69, vol. 4, No. 1.

* cited by examiner

Financial instrument record
AAPL (0x23F8A10E)

CURRENT LIQUIDITY

| | BID | | | | ASK | | |
|---|---|---|---|---|---|---|---|
| orders | size | price | market | market | price | size | orders |
| 2 | 200 | $390.66 | ARCA | BATS | $390.68 | 200 | 2 |
| 3 | 500 | $390.66 | NASD | ARCA | $390.69 | 500 | 3 |
| 2 | 300 | $390.65 | BATS | NASD | $390.69 | 300 | 2 |
| 4 | 600 | $390.65 | NYSE | NYSE | $390.70 | 600 | 4 |
| 2 | 200 | $390.64 | BATS | BATS | $390.70 | 200 | 2 |
| 2 | 200 | $390.64 | ARCA | ARCA | $390.71 | 200 | 2 |

| | TRADE STATS | | | |
|---|---|---|---|---|
| market | last price | VWAP | volume | volume share |
| AGGREG | $390.67 | $390.73 | 14.25M | 100% |
| ARCA | $390.68 | $390.72 | 1.92M | 13.5% |
| BATS | $390.69 | $390.72 | 1.34M | 8.7% |
| NASD | $390.69 | $390.73 | 5.98M | 42.0% |
| NYSE | $390.70 | $390.74 | 4.23M | 29.7% |

| | LIQUIDITY STATS | | | |
|---|---|---|---|---|
| market | best bids | best asks | best bid share | best ask share |
| AGGREG | 2,548M | 4,234M | 100% | 100% |
| ARCA | 456M | 832M | 17.9% | 19.7% |
| BATS | 654M | 1,108M | 25.7% | 26.2% |
| NASD | 1,082M | 1,293M | 42.5% | 30.5% |
| NYSE | 345M | 983M | 13.5% | 23.2% |

Figure 4

METHOD AND APPARATUS FOR MANAGING ORDERS IN FINANCIAL MARKETS

CROSS-REFERENCE AND PRIORITY CLAIM TO RELATED PATENT APPLICATIONS

This patent application is a divisional of U.S. patent application Ser. No. 13/316,332, entitled "Method and Apparatus for Managing Orders in Financial Markets", filed Dec. 9, 2011, now U.S. Pat. No. 10,037,568, which claims priority to provisional patent application 61/421,545, entitled "Method and Apparatus for Managing Orders in Financial Markets", filed Dec. 9, 2010, the entire disclosures of each of which are incorporated herein by reference.

This patent application is related to PCT patent application PCT/US2011/064269, entitled "Method and Apparatus for Managing Orders in Financial Markets", filed Dec. 9, 2011, and published as WO Publication WO2012/079041, the entire disclosure of which is incorporated herein by reference.

This patent application is also related to U.S. Pat. Nos. 7,840,482, 7,921,046, and 7,954,114 as well as the following published patent applications: U.S. Pat. App. Pub. 2007/0174841, U.S. Pat. App. Pub. 2007/0294157, U.S. Pat. App. Pub. 2008/0243675, U.S. Pat. App. Pub. 2009/0182683, U.S. Pat. App. Pub. 2009/0287628, U.S. Pat. App. Pub. 2011/0040701, U.S. Pat. App. Pub. 2011/0178911, U.S. Pat. App. Pub. 2011/0178912, U.S. Pat. App. Pub. 2011/0178917, U.S. Pat. App. Pub. 2011/0178918, U.S. Pat. App. Pub. 2011/0178919, U.S. Pat. App. Pub. 2011/0178957, U.S. Pat. App. Pub. 2011/0179050, U.S. Pat. App. Pub. 2011/0184844, and WO Pub. WO 2010/077829, the entire disclosures of each of which are incorporated herein by reference.

INTRODUCTION

FIG. 1 provides a block diagram of an exemplary trading platform. A general role of financial exchanges, crossing networks and electronic communications networks is to accept orders to buy/sell financial instruments, maintain sorted listings of buy/sell orders for each financial instrument, and match buyers/sellers at the same price (transact trades). Financial exchanges, crossing networks and electronic communications networks report all of this activity on various types of financial market data feeds as described in the above-referenced and incorporated U.S. Pat. App. Pub. 2008/0243675. As used herein, a "financial instrument" refers to a contract representing an equity ownership, debt, or credit, typically in relation to a corporate or governmental entity, wherein the contract is saleable. Examples of financial instruments include stocks, bonds, options, commodities, currency traded on currency markets, etc. but would not include cash or checks in the sense of how those items are used outside the financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein). Furthermore, the term "financial market data" as used herein refers to data contained in or derived from a series of messages that individually represent a new offer to buy or sell a financial instrument, an indication of a completed sale of a financial instrument, notifications of corrections to previously-reported sales of a financial instrument, administrative messages related to such transactions, and the like. Feeds of messages which contain financial market data are available from a number of sources and exist in a variety of feed types—for example, Level 1 feeds and Level 2 feeds as discussed herein.

Dark Pools play a similar function of matching up buyers and sellers, but do not provide full visibility into the available liquidity and pricing information. Dark Pools may be operated by financial exchanges, investment banks, or other financial institutions. Dark Pools are rapidly becoming a key market center for electronic trading activity, with a substantial proportion of transactions occurring in dark pools, relative to public markets.

In order to facilitate the development of trading applications that leverage real-time data from multiple market centers (and their concomitant feeds), trading platforms typically normalize data and perform common data processing/enrichment functions in ticker plants, as described in the above-referenced and incorporated U.S. Pat. App. Pub. 2008/0243675 and WO Pub. WO 2010/077829.

Trading strategies consume normalized market data, make decisions to place buy/sell orders, and pass those orders on to an order management system. Note that those orders may provide guidance to the order management system on where to route the order (e.g. whether or not it should be routed to a dark pool), how long the order should be exposed in the market before canceling it (if it is not executed), and other conditions governing the management of the order in the marketplace.

An Order Management System (OMS) (which can also be referred to as an Execution Management System (EMS)) is responsible for managing orders from one or more trading applications. Note that the OMS/EMS may be responsible for managing orders from multiple trading entities. These entities may be competing trading groups within the same investment bank. These entities may also be independent financial institutions that are accessing the market through a common prime services broker or trading infrastructure provider.

The function of the OMS/EMS is to enter orders into a market. Prior to entering an order into a market, the OMS may first perform a series of checks in order to deem the order "valid" for placement. These checks can include:
  Individual account and risk profile
    Order quantity, instant and cumulative
    Quantity-price product, instant and cumulative
    Cumulative net value on position
    Percent away from last tick and/or open
    Position limits, margins
    Entitlements (market access, short-sales, options, odd lots, ISO, etc.)
  Corporate account and risk profile
    Order quantity, instant and cumulative
    Quantity-price product, instant and cumulative
    Cumulative net value on position
    Percent away from last tick and/or open
    Position limits, margins
    Entitlements (market access, short-sales, options, odd lots, ISO, etc.)
    Corporate "restricted list" of symbols
  Regulatory
    Short sale restrictions
    Halted instruments
    Tick rules
    Trade through
It can be noted that these checks are driven by account, risk, and regulatory data accessible by the OMS, as well as a view of the current state of the markets provided via normalized market data from a ticker plant.

It can also be noted that the OMS/EMS typically is used to manage order placement into multiple markets, including dark pools. Once an order is declared to be appropriate (i.e., "valid"), one of the primary functions of the OMS/EMS is to select the destination for each incoming order. Note that the OMS/EMS may also choose to sub-divide the order into smaller orders that may be routed the same or different markets. The OMS/EMS makes routing decisions based on the current state of the markets provided via normalized market data from a ticker plant, as well as routing parameters input to the OMS/EMS. Routing parameters may be scoped on a per-account or corporate basis. These parameters may include:

Per-market fee and rebate structure
Account fee and rebate structure
Per-market outstanding limit
Market access latency (continuously updated estimate of intra-exchange latency)
Routing strategy
  Best net execution price (including transaction fees, maker/taker models, etc.)
  Lowest fee
  Inter-market Sweep Order (ISO) to all markets
  Market preference on order
Order split rules
  Range of markets
  Max size per market
  Price delta limit from current price of each market Once the OMS has made a decision of where and how to route an order, it may then attempt to optimize the order and communication channel in which it transmits orders to a given market (order entry optimization). For example, orders with a higher probability of getting filled (matched) may be placed prior to orders with a lower probability of getting filled, or orders meeting certain criteria, such as order types or specific financial instruments, may have a higher probability of being filled by utilizing one communication channel rather than another. The order entry optimization may also incorporate the current view of the market (from the normalized market data) as well the current estimate of intra-market latency for the given market.

FIG. 2 presents a diagram of a conventional OMS/EMS implementation known in the art. Typically, a plurality of servers 200 and network infrastructure (switches, routers, etc.) are employed to host one or more instances of OMS/EMS functions that are interconnected via one or more messaging buses 204, 206, and 208. The OMS/EMS functions are typically implemented in software components that execute on general-purpose processors (GPPs) present in the plurality of servers 202. As shown in FIG. 2, normalized market data from a ticker plant is distributed to OMS/EMS software components via a market data messaging bus 204. Similarly an order entry messaging bus 206 carries incoming orders from trading strategies, order-related messages between OMS/EMS software components, outgoing orders to markets, and order responses from markets. A database access messaging bus 208 provides OMS/EMS software components with access to databases of entitlements, regulatory parameters, risk profiles, accounts, order routing parameters, and position blotters.

One or more order validation software components are deployed on one or more servers 202. Each order validation software component requires a market data interface to the messaging bus. The interface allows the validation software component to request the necessary market data to perform validation on incoming orders. Similarly, the order validation software components listen for new incoming orders from trading strategies on the order entry bus. Note that the latency of market data delivery and the bandwidth available on the market data bus affect the quality and quantity, respectively, of data used by the order validation software component. Furthermore, the distribution of order validation software components across multiple servers 202 segments validation decisions. As result, the previously described validation decisions are performed on a limited view of data, which introduces risk, or validation decisions are delayed until data from disparate components can be compiled in order to build a comprehensive view of risk. Such delays may reduce or eliminate market opportunities that depend on a fast response to trading opportunities.

Orders that pass the validation checks are forwarded to one or more routing strategy software components that perform order placement into multiple markets, as previously described. Like the order validation software components, each routing strategy software component requires a market data interface to the market data messaging bus through which it receives current pricing information. The order routing software components typically require a price-aggregated view of the book for the instruments for which it is routing new orders. These book views may be cached locally in the routing strategy software components or requested via the market data interface. The latency associated with these book views directly affects the quality of the data used by the routing strategy software components to make order routing decisions. Delayed data may cause a routing strategy software component to make a decision that results in a missed trading opportunity or a trading loss. Once a routing strategy software component makes a routing decision, the order along with its handling instructions and destination market is forwarded on to the order entry bus.

Typically, output orders from the routing strategy software components are directly passed to one or more FIX engine software components that implement the order-entry interface to one or more markets. The FIX engine software components pass outgoing orders to the markets and pass incoming order responses from the markets to the order entry bus. The latency induced by another transition over a messaging bus and the FIX engine processing represents an additive contribution to the total latency of the OMS/EMS.

Optionally, an OMS/EMS may include one or more order entry optimization software components. As previously described, these software components impose a priority ordering on the orders passed on to the markets. When included in the OMS/EMS, the software components receive orders from the routing strategy software components via the order entry bus, perform their priority queuing operation, and pass orders destined for the market to the appropriate FIX engine software components via the order entry messaging bus. As with the FIX engine software components, the latency induced by another transition over a messaging bus and the order entry optimization processing represents an additive contribution to the total latency of the OMS/EMS.

Thus, distributing OMS/EMS components across multiple systems results in added complexity and latency, which introduces regulatory risk and limits the opportunity to capitalize on latency-sensitive trading opportunities. Furthermore, the overhead of inter-component communication may limit the quantity of data available to components to perform their tasks. This may introduce additional regulatory risk and may further limit trading opportunities.

As a solution to these technical problems of complexity and latency, the inventors disclose a variety of embodiments whereby tight integration is provided between system components to thereby dramatically improve latency and reduce communication complexity.

For example, the inventors disclose an apparatus comprising a processor configured as an order management engine, the order management engine configured to (1) process a plurality of orders relating to a plurality of financial instruments based on a plurality of inputs, and (2) integrate at least two members of the group consisting of an order validation operation, a routing strategy operation, a position blotter operation, and an order entry optimization to thereby process the orders.

As another example, the inventors disclose a method comprising (1) processing, by a processor configured as an order management engine, a plurality of orders relating to a plurality of financial instruments based on a plurality of inputs, wherein the processing comprises performing at least two members of the group consisting of an order validation operation, a routing strategy operation, a position blotter operation, and an order entry optimization via integrated components of the order management engine.

As still another example, the inventors disclose an apparatus comprising a trading platform, the trading platform configured to receive and process streaming financial market data, the trading platform comprising at least two members of the group consisting of (1) a ticker plant engine, (2) a trading strategy engine, and (3) an order management engine, each integrated within the trading platform.

As another example, the inventors disclose a method comprising receiving and processing, by a trading platform, streaming financial market data, the trading platform comprising at least two members of the group consisting of (1) a ticker plant engine, (2) a trading strategy engine, and (3) an order management engine, each integrated within the trading platform.

The inventors also disclose an apparatus comprising a trading platform, the trading platform configured to receive and process streaming financial market data, the trading platform comprising a host system, and a trading strategy engine, wherein the trading strategy engine is configured to offload from the host system at least a portion of a trading strategy with respect to one or more financial instruments and one or more financial markets.

Further still, the inventors disclose a method comprising (1) receiving and processing, by a trading platform, streaming financial market data, the trading platform comprising a host system and a trading strategy engine, and (2) the trading strategy engine offloading from the host system at least a portion of a trading strategy with respect to one or more financial instruments and one or more financial markets.

These and other features and advantages of the present invention will be understood by those having ordinary skill in the art upon review of the description and figures hereinafter.

BRIEF DESCRIPTION OF THE DRAWINGS

FIG. 4 depicts an exemplary view of financial market data that can be provided by a market view component of an OME.

DETAILED DESCRIPTION OF THE PREFERRED EMBODIMENTS

Order Management Engine

Figure 1:
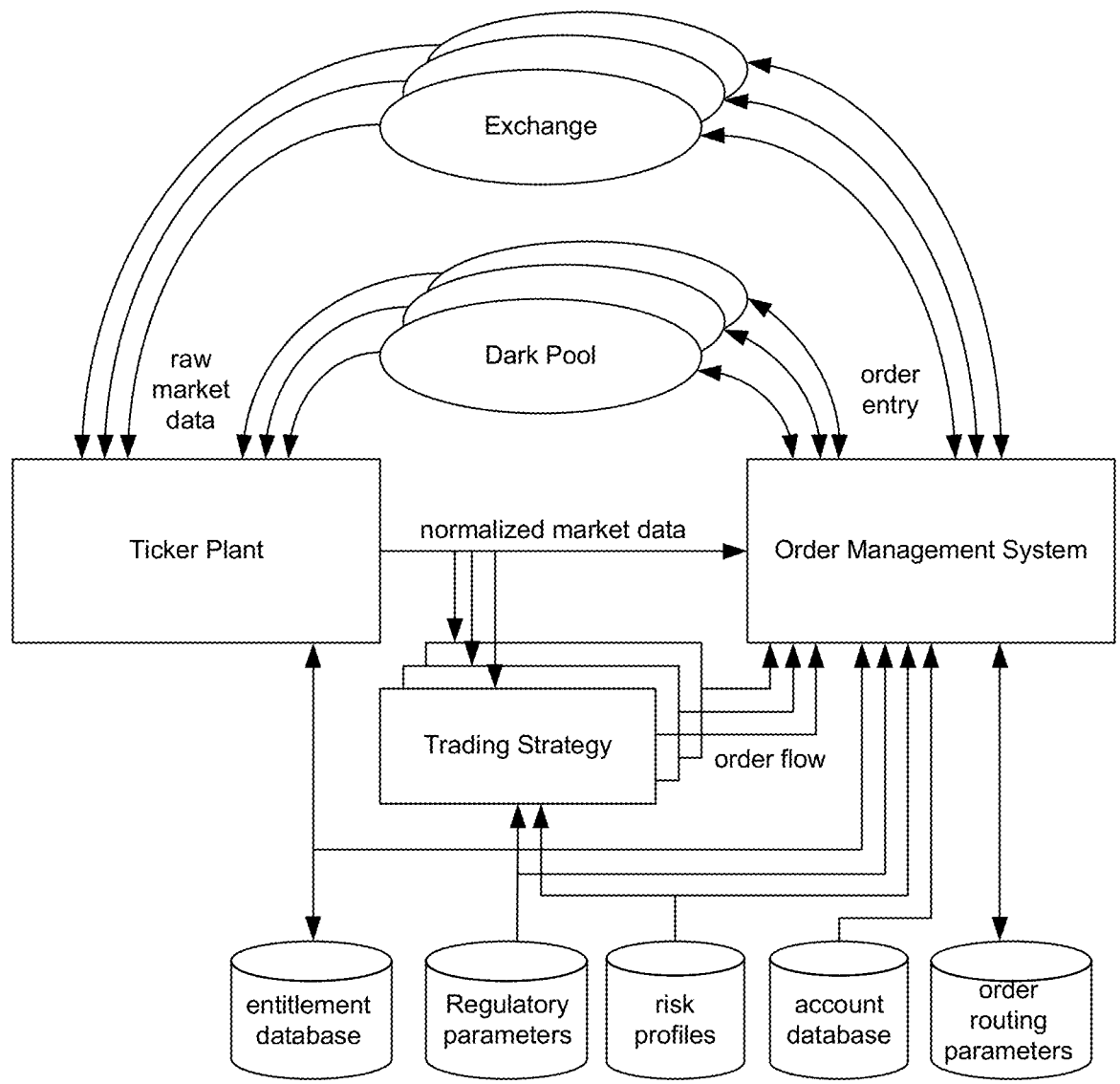
FIG. 1 depicts an exemplary trading platform.
Figure 2:
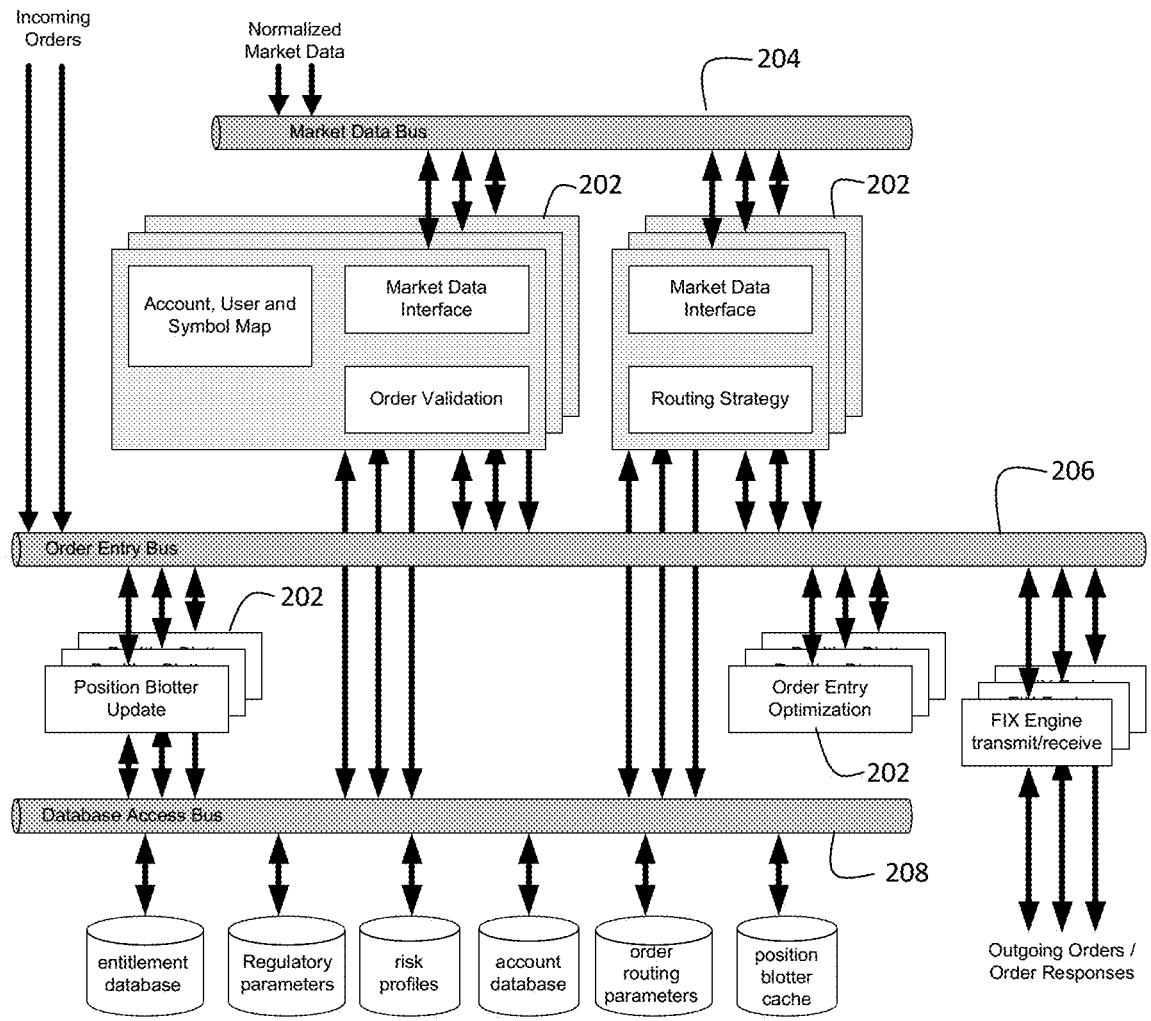
FIG. 2 depicts a conventional OMS/EMS.
Figure 3:
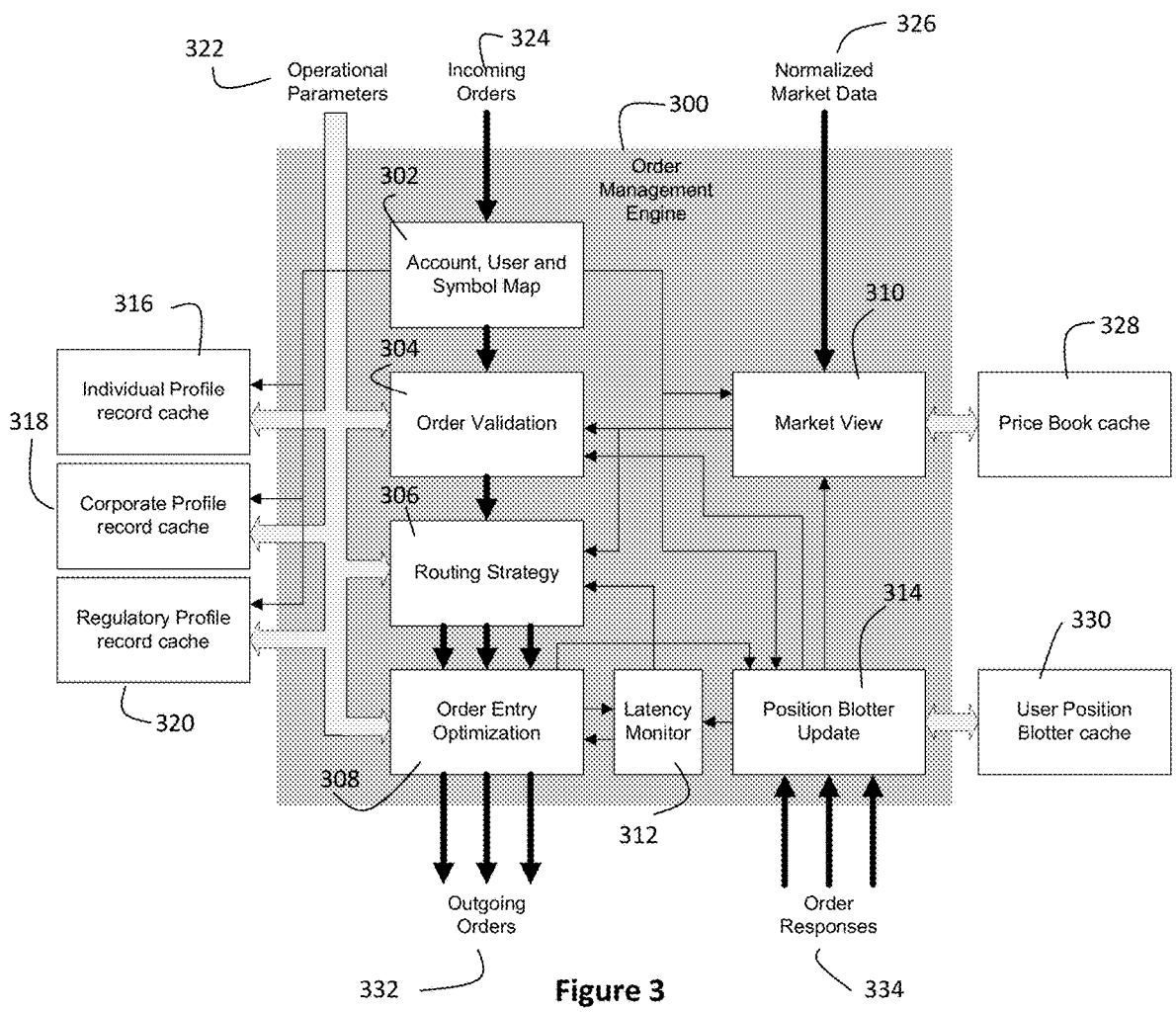
FIG. 3 depicts an exemplary embodiment of an integrated order management engine (OME)

FIG. 3 provides a block diagram of an exemplary order management engine (OME) 300 that integrates various functional components of an OMS/EMS. The integrated engine we describe herein provides significant advantages over the state-of-the-art by significantly reducing latency and complexity while expanding the breadth and increasing the quality of data that may be shared among the components. For example in an embodiment where engine components are deployed on a reconfigurable logic device, on-chip interconnects in the reconfigurable logic device have the potential to provide orders of magnitude more communication bandwidth between components hosted on the same device, as compared to components hosted on disparate servers interconnected via commodity network links. These advantages provide the OME disclosed herein with an opportunity to reduce risk and to more effectively capitalize on latency-sensitive trading opportunities.

As shown in FIG. 3, the OME is comprised of a set of parallel components that each performs a subset of the OMS/EMS functionality. The primary datapath of the order management engine (OME) is organized as a feed-forward pipeline: orders flow from the mapping component 302 to the order validation component 304 to the routing strategy component 306 to the order entry optimization component 308. This eliminates the latency and complexity overhead of general-purpose messaging buses interconnecting disparate components. Additionally, this architecture maps well to parallel processing devices such as reconfigurable logic devices (e.g., Field Programmable Gate Arrays (FGPAs)), graphics processing units (GPUs), and chip-multi-processors (CMPs). Feedback from the markets (e.g order accept/reject, order fills, latency measurements via order responses 334) is also propagated to the appropriate component via dedicated interconnects which are only practical in an integrated design. Note that each of the components may exploit parallelism internally in order to maximize throughput and minimize processing latency. Subsequently, we provide examples of parallel implementations of OME components.

The OME can ingest a stream of orders 324 originating from one or more trading strategies from one or more trading entities. Preferably, those trading strategies are accelerated and hosted on the integrated trading platform as described herein in connection with FIG. 7, although this need not be the case. Incoming orders 324 preferably contain the following fields: instrument key, individual account number, corporate account number, order type, order price, order size, order handling conditions. The instrument key uniquely identifies the financial instrument associated with the order. This key may be in one of various forms, including a string of alphanumeric characters assigned by the financial exchange, an index number assigned by the financial exchange, or an index number assigned by the ticker plant.

The mapping component 302 resolves a unique identifier for the financial instrument used by the OME to track per-instrument state. Preferably this key is an index number that allows instrument state to be directly indexed using the number. The mapping component also resolves the unique instrument identifier required for order entry into the markets. Preferably, the mapping component also resolves the instrument identifier required to retrieve the current pricing information from the market view component. As described the above-referenced and incorporated U.S. Pat. App. Pub. 2008/0243675, the mapping is preferably accomplished by using a hash table implementation to minimize the number of memory accesses to perform the mapping. Similarly, the mapping component resolves a unique identifier for the individual and corporate risk profile records.

In order to seed the order validation checks, the mapping component also initiates the retrieval of relevant validation information associated with the order from one or more of the following sources:

Individual account and risk profile record cache 316
    Corporate account and risk profile record cache 318
    Regulatory record cache 320

Preferably, each of the caches is stored in high-speed memory directly attached to the device hosting the mapping component. Such local memory may be initialized from a centralized database during maintenance windows when trading is not occurring via the operational parameters 322 interface shown in FIG. 3. The individual account and risk profile is retrieved by using the unique identifier mapped from the individual account number from the incoming order. The corporate account and risk profile is retrieved by using the unique identifier mapped from the corporate account number from the incoming order. The regulatory record is retrieved using the unique instrument identifier mapped from the instrument key as previously described. While the mapping component initiates the retrievals, the read results from the caches are passed to downstream components: order validation, routing strategy, and order entry optimization. In doing so, the mapping component pre-fetches the necessary records for downstream computations, thus masking the latency of the record retrieval from the caches.

Similarly, the mapping component initiates the retrieval of current pricing information for the financial instrument by passing the mapped instrument identifier to the market view component 310.

The market view component can ingest normalized market data 326 from a logically upstream ticker plant. Examples of ticker plants that can be employed for this purpose are the ticker plant engines described in described in the above-referenced and incorporated U.S. Pat. App. Pub. 2008/0243675 and WO Pub. WO 2010/077829. The market view component provides a current view of the markets to other components within the OME. Typically, the view of the market is provided as regional and composite price-aggregated book views for each financial instrument such as those described in the above-referenced and incorporated WO Pub. WO 2010/077829. In the preferred embodiment, the market view component provides a current pricing record to downstream OME components that includes a snapshot of current liquidity in the form of a limited-depth price-aggregated composite book, liquidity statistics, and trade statistics, as shown in FIG. 4. The depth of the composite book view may be set as a configuration parameter, or may be dynamically determined by size of the incoming order that triggered the record retrieval. In the latter case, the depth would be chosen to provide visibility into enough liquidity to fill the order on one or more venues. The liquidity statistics provide downstream components with information about the historical share of the best bid and best offer price (i.e. what percentage of the time has the best bid price been available on BATS). The trade statistics present downstream components with a pan-market summary of execution activity for the financial instrument, such as the percentage of the current daily volume that has been executed on a particular market.

In addition to ingesting normalized market data, the market view component has the ability to update those regional and composite book views based on order entry confirmation and order fill reports received from the markets. This information from the order entry interfaces of financial markets is processed by the position blotter component. The position blotter updates the view of current outstanding positions in the market and makes this view available to the market view component, as well as other OME components. Updates to the view of outstanding positions may allow the current view of the market to be updated prior to the concomitant updates being received via the upstream ticker plant that consumes the exchanges' market data feeds. In order to prevent redundant updates to the books, the market view component can maintain a cache 328 of updates triggered by the order entry responses. When a concomitant market data update is received, it must be omitted or adjusted by the amount of liquidity added/removed by the order entry response event.

Similar to the retrieval of necessary regulatory and account records, the retrieval of the financial instrument record from the market view component masks the latency of record retrieval for downstream components.

It should also be noted that optionally, the market view component 310 can itself be a ticker plant engine that ingests financial market data to produce normalized financial market data for consumption by the order validation component.

The order validation component 304 maintains independent input buffers for incoming orders, the regulatory and account records, and the market data records. The buffers provide a synchronization mechanism whereby the order validation component initiates its computations for a new order when all necessary record information is available. The order validation component contains a plurality of rule engines that perform a set of checks as described in the Introduction. Thus the rules engine can instantiate various rules and validate orders (or groups of orders) against those rules. Such rules may be derived from any or all of the following validation rules discussed above (although it should be understood that other validation rules may be desired by a practitioner):

Individual account and risk profile
        Order quantity, instant and cumulative
        Quantity-price product, instant and cumulative
        Cumulative net value on position
        Percent away from last tick and/or open
        Position limits, margins
        Entitlements (market access, short-sales, options, odd lots, ISO, etc.)
    Corporate account and risk profile
        Order quantity, instant and cumulative
        Quantity-price product, instant and cumulative
        Cumulative net value on position
        Percent away from last tick and/or open
        Position limits, margins
        Entitlements (market access, short-sales, options, odd lots, ISO, etc.)
        Corporate "restricted list" of symbols
    Regulatory
        Short sale restrictions
        Halted instruments
        Tick rules
        Trade through An example of a rules engine that can be employed toward this end is disclosed in the above-referenced and incorporated U.S. Pat. App. Pub. 2009/0287628. Note that the set of rule engines may leverage data parallelism (multiple copies of identical rule engines) and functional parallelism (pipeline of function-specific rule engines) to achieve the desired throughput and latency for the order validation component.

Figure 5:
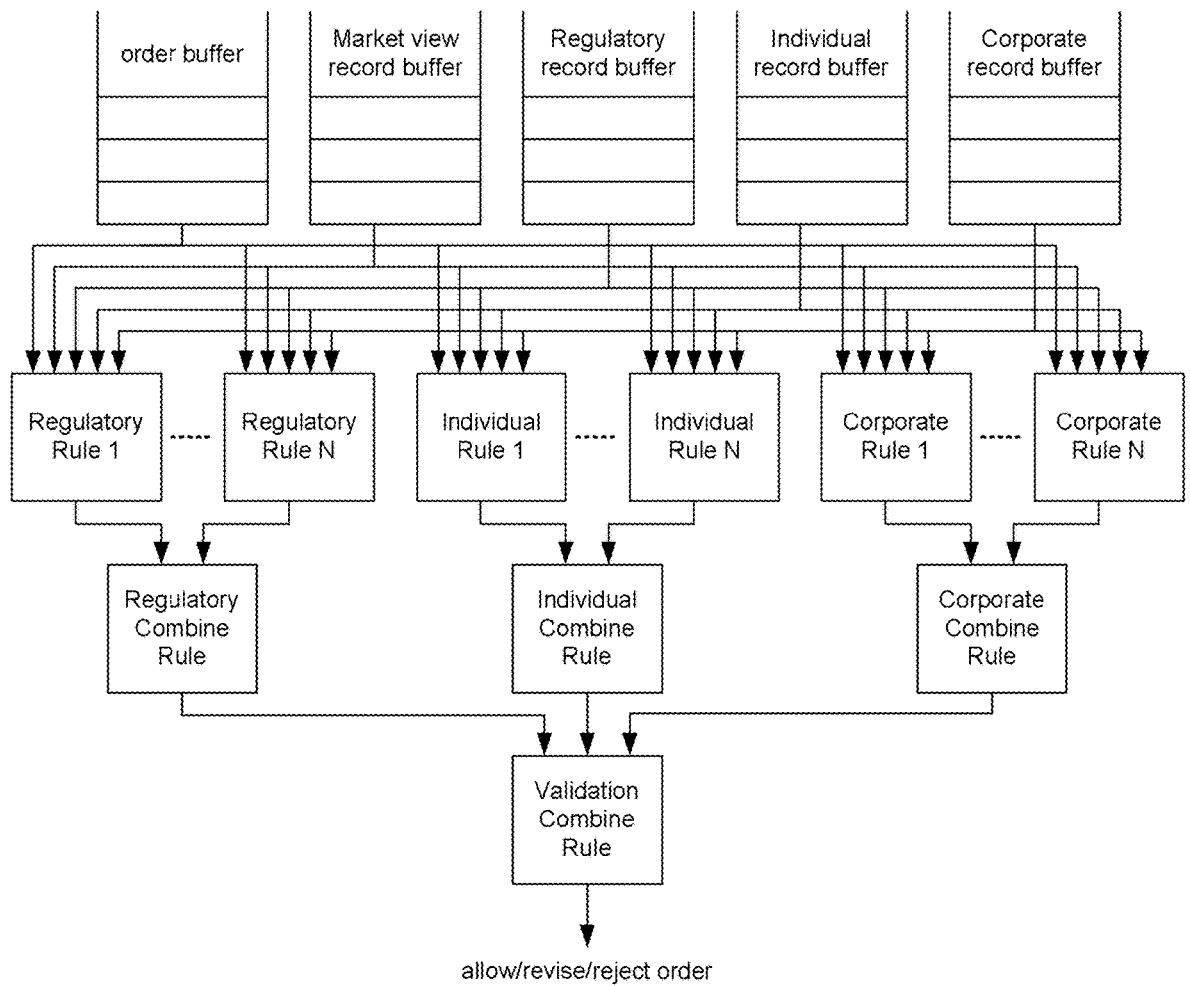
FIG. 5 depicts exemplary rules engines that can be employed in an order validation component of the OME.

The specific set of checks is dictated by the validation information associated with the order (that was retrieved during the order mapping step). If all checks pass, the order is declared as valid and passed on to the routing strategy component. Note that the order validation component may update validation records and write them back to the appropriate record cache, e.g. The current and cumulative statistics on positions for a given account may be updated. As shown in FIG. 5, rule engines within the order validation component may be organized to perform checks in parallel. The output of those parallel checks can be combined in one or more rule engines that ultimately produce a decision to accept, reject, or modify the order. Examples of checks include:

Regulatory: IF the instrument is currently under a short-sale restriction AND the order is an offer to sell that represents a short sale, THEN reject the order.

Regulatory: IF the instrument is currently under a volatility trading pause on the NASDAQ market, THEN modify the order to restrict routing to the NASDAQ market.

Regulatory: IF the instrument is on a restricted stocks in the corporate account record (because the bank is involved in a merger deal with the company), THEN reject the order.

Individual: IF the notional value of the order to buy a derivatives contract is greater than the credit line available to the individual trading account, THEN reject the order.

Corporate: IF the aggregate notional value of all outstanding orders for the bank exceeds the defined threshold in the corporate record, THEN reject the order.

The combinatorial rules are typically more straightforward, as a reject result from any of the individual rule checks results in a reject decision for the order. The number of independent rule engines provisioned in the order validation component can be determined by the throughput requirement for the component and an analysis of the complexity of rule checks that must be performed.

Modified and accepted orders are forwarded to the routing strategy component 306, along with its concomitant records via a dedicated interconnect. This allows the routing strategy component to immediately begin processing the order. The routing strategy component determines if a valid order is to be partitioned and where the order (or each order partition) is to be routed. Similar to the order validation component, the routing strategy component utilizes a plurality of rules engines such as those described in the above-referenced and incorporated U.S. Pat. App. Pub. 2009/0287628 to make these decisions (which may also employ a parallelization strategy). The decisions are driven by routing parameters contained in the individual account, corporate account, and regulatory records, as well as data from the market view component and the position blotter component. The rules implement the types of routing strategies outlined in the Introduction. Once a routing decision is completed by the rules engines, the order (or order partitions) are passed on to the order entry optimization component 308 with directives on where and how to enter the order (or order partitions) into the market. Note that an order may be entered into a market with a wide variety of parameters that direct the exchange (or dark pool) on how the order may be matched. The routing strategy component also updates the position blotter component to reflect a new position in the market.

The latency monitor component 312 utilizes data from outgoing order events 332 and incoming order response events 334 to maintain a set of statistics for each channel to each market. The latency statistics may include estimates of intra-exchange latency based on measurements of the round-trip-time (RU) from transmitting a new order on a channel to receiving a response event (either an order accept, reject, or fill notification). The statistics may include the last measurement as well as the average, minimum, and maximum for a defined time window (e.g. a moving average). The latency statistics may also be further refined to include statics on a per-instrument/per-order-type basis for each channel. Such measurements can be performed by recording a timestamp for the transmission of an order entry event, timestamping each order entry response event, identifying the order entry event that corresponds to the response event, and then computing the difference in timestamps.

Figure 6:
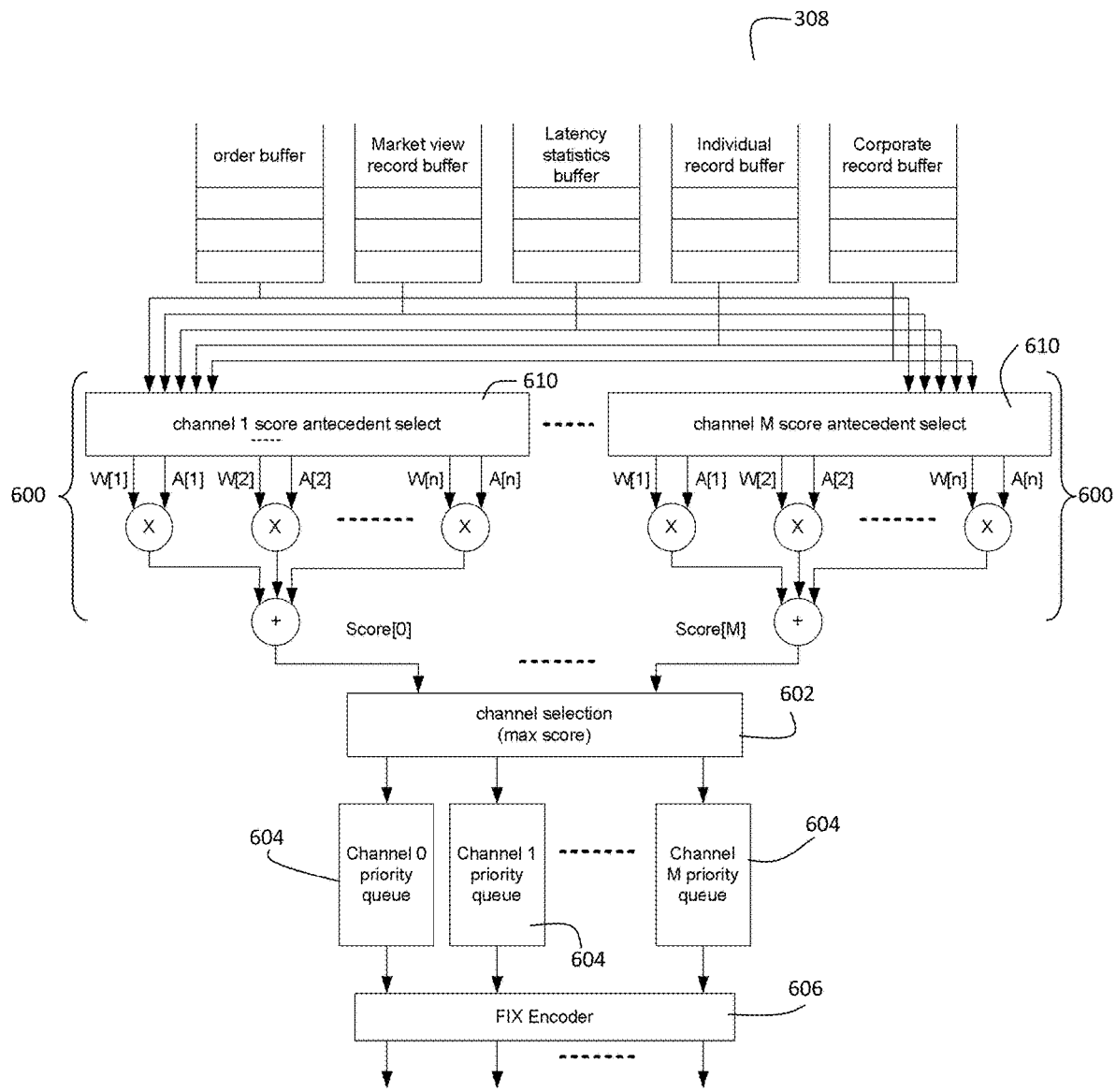
FIG. 6 depicts an exemplary order entry optimization component of the OME.

The order entry optimization component 308 optimizes the sequence in which orders are transmitted to a given market. Furthermore, the component may select the appropriate communication channel to the market if multiple channels are available. The order entry optimization component utilizes the directives from the routing strategy component, as well current estimates of intra-exchange latency computed for each independent channel to that market. The latency estimates for each instrument and order type combination may also be incorporated. As shown in FIG. 6, the order entry optimization component 308 may employ various buffers to store order data, market view data, latency statistical data, individual records data, and corporate records data. The order entry optimization component first computes a vector of scores for each new order via a plurality of computation subcomponents 600, each associated with a channel. Each score in the vector represents a relative priority for an available channel. The channel selection subcomponent 602 selects the highest score and stores the order for transmission in the queue 604 for the channel associated with that selected highest score. The score associated with the order is also used to determine its insertion point into the queue 604. Thus, each queue 604 is associated with a channel and can be implemented as a priority queue that allows new entries to be inserted with a relative priority score, i.e. the order will be inserted ahead of items with a lower score.

A FIX encoder subcomponent 606 then services the queues 604 to generate the outgoing orders 332 in accordance with the selected channels and other optimizations.

An exemplary computation subcomponent 600 can score order channels as a simple weighted sum of antecedents: $sum(W[i]*A[i])$, where $W[i]$ is a user specified weight, and $A[i]$=antecedent. Exemplary antecedents include:

Estimated intra-exchange latency for the channel, instrument, order-type combination Number of outstanding orders on the channel by instrument Number of outstanding orders on the channel by aggregate number Price delta of order price to current best bid and best offer on target market Liquidity depth, defined to be the total size available between best bid/ask price and order price A score antecedent selection subcomponent 610 can be employed by the computation subcomponent 600 to select which data from the buffers is to be used for antecedent values.

As indicated above, the subcomponents of the order entry optimization component 308 shown in FIG. 6 can be implemented in hardware logic pipelines or other parallel processing-capable architectures to exploit parallelism internally in order to maximize throughput and minimize processing latency.

The position blotter update component 314 processes order entry response messages 334 from the various markets. The response messages notify the OME of which orders were placed, executed, cancelled, rejected, etc. The position blotter provides updates to the market view component when orders are placed so that the views of the market can be updated with less latency than receiving the update via the market data feed from the market center. Through a dedicated interconnect between the position blotter update component and the market view component, such updates can be passed with minimal overhead. Thus, when the OME 300 receives confirmation that an order has been placed from a destination market, the OME is able to modify its internal view of the state of the market to include the placed order. This provides the OME with a current view of the market, before the change is reported on the public market data feed. This latency advantage in the market view may then be leveraged by the OME and any trading strategies with access to such data.

The position blotter also tracks the current set of outstanding positions that the OME is managing. The component allows the order validation component and routing strategy component to incorporate a view of the outstanding positions when making validation and routing decisions.

The OME may be implemented on high performance computational platform, such as an offload engine or the like. Examples of a suitable computational platform for the OME include a reconfigurable logic device (e.g., a field programmable gate array (FPGA) or other programmable logic device (PLD)), a graphics processor unit (GPU), and a chip multiprocessors (CMP). However, it should be understood that the OME could also be deployed on one or more general purpose processors (GPPs) or other appropriately programmed processors if desired. It should also be understood that the OME may be partitioned across multiple reconfigurable logic devices (or multiple GPUs, CMPs, etc. if desired).

As used herein, the term "general-purpose processor" (or GPP) refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor. As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture. Furthermore, as used herein, the term "software" refers to data processing functionality that is deployed on a GPP or other processing devices, wherein software cannot be used to change or define the form of the device on which it is loaded, while the term "firmware", as used herein, refers to data processing functionality that is deployed on reconfigurable logic or other processing devices, wherein firmware may be used to change or define the form of the device on which it is loaded.

Thus, in embodiments where one or more components of the OME is implemented in reconfigurable logic such as an FPGA, hardware logic will be present on the device that permits fine-grained parallelism with respect to the different operations that such components perform, thereby providing such a component with the ability to operate at hardware processing speeds that are orders of magnitude faster than would be possible through software execution on a GPP.

Further, the OME may be hosted in a dedicated system with computer communications links providing the interfaces to the normalized market data, order entry interfaces of markets, and order flow from trading strategies. In a preferred embodiment, the OME is hosted in an integrated system where the full trading platform is hosted.

Integrated Trading Platform

Figure 7:
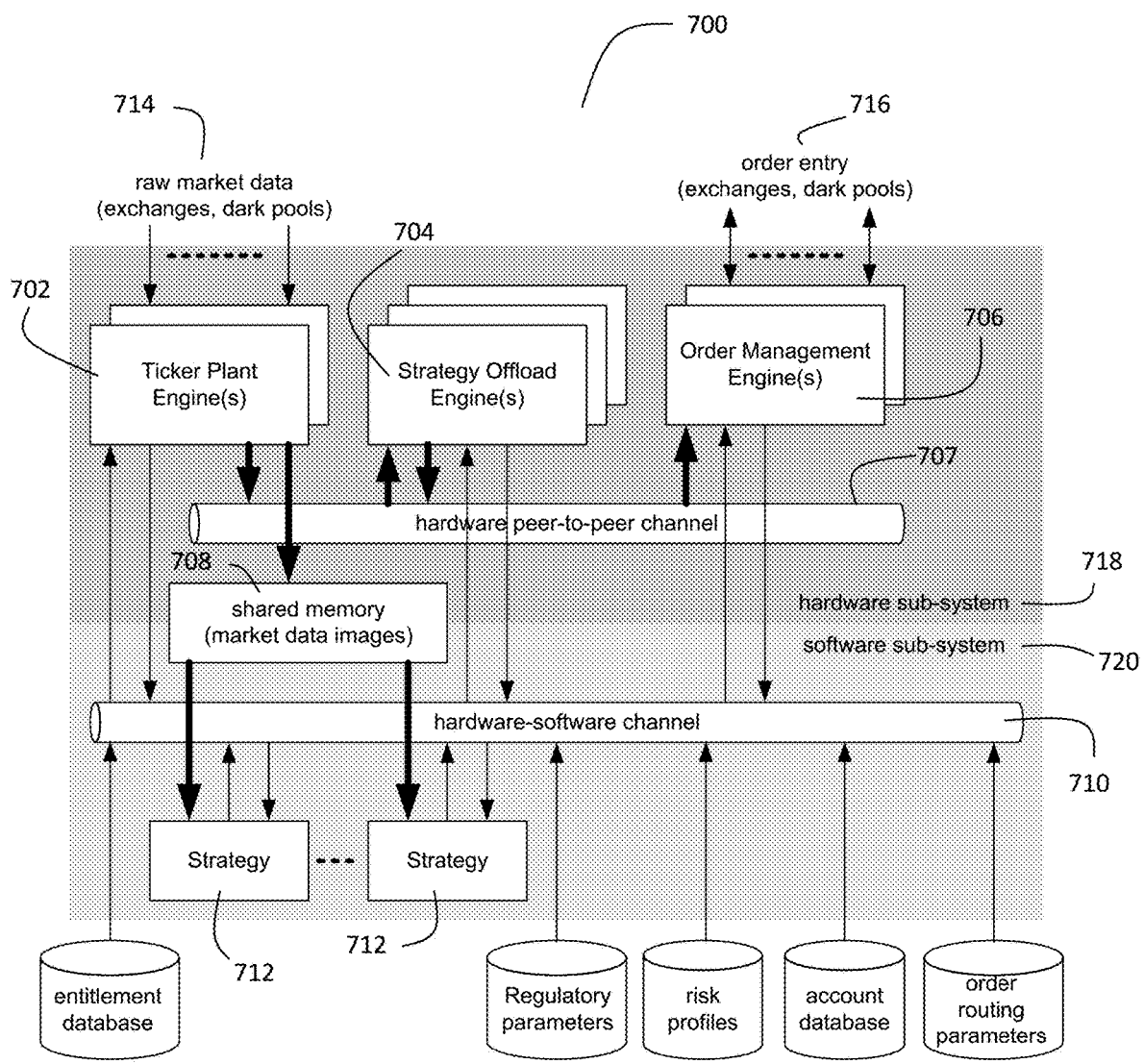
FIG. 7 depicts an exemplary integrated trading platform.

FIG. 7 presents an exemplary block diagram of an integrated trading platform 700 that may be hosted on a single computing system. A single computing system may be a single server, appliance, "box", etc. The system preferably uses intra-system interconnections to transfer data between the ticker plant engine(s) 702, trading strategies 704 and/or 712, and order management engine(s) 300. The integrated trading platform provides the following advantages over the state of the art (where it should be understood that this list is not exhaustive):

Reduced overall latency from market data receipt to order entry. Such an overall latency reduction can arise from lowered communication latency between components and lowered latency of component processing time by offloading to acceleration engines (e.g., reconfigurable logic).

Reduced space/power requirements for deploying a trading platform. This can be especially important for co-location in exchange datacenters.

Increased available bandwidth for data sharing among the trading platform components. This provides for tighter integration between components and allows components to make decisions based on additional data, thereby widening the scope of possible strategies and allowing for more complex and comprehensive processing.

The amount of general-purpose computing resources available in a single host system is fundamentally limited. This implies that pure software implementations of the trading platform or trading platform components will provide less capacity and latency performance relative to systems that leverage hardware-accelerated designs. In order to achieve a higher level of performance in a single system, trading platform components are preferably offloaded to engines that do not consume general purpose computing resources and leverage fine-grained parallelism.

Thus, as shown in FIG. 7, a host system for the trading platform can comprise a software sub-system 720 and a hardware sub-system 718, wherein the software sub-system may comprise one or more host processors and one or more associated host memories. Aspects of the trading platform such as one or more of the ticker plant engine(s) 702, strategy offload engine(s) 704, and OMEs 300 can be offloaded to the hardware sub-system for improved performance as described herein.

The ticker plant engine(s) 702 can normalize and present market data 714 from disparate feeds for presentation to consuming applications (including consuming applications that are resident in the software sub-system 720). Examples of a suitable ticker plant engine 702 are the ticker plant engines described in the above-referenced and incorporated U.S. Pat. App. Pub. 2008/0243675 and WO Pub. WO 2010/077829, which can leverage the parallelism provided by reconfigurable logic devices to provide dramatic acceleration over conventional ticker plants. Furthermore, as shown in FIG. 7 and described in the above-referenced and incorporated U.S. Pat. App. Pub 2008/0243675 and U.S. Pat. App. Pub 2007/0174841, the ticker plant engines can write normalized market data to shared system memory 708 (for consumption by trading strategies written in software and executing on the general purpose computing devices in the system) and to shared memory in other offload engines in the system via a peer-to-peer hardware interconnect 707. The peer-to-peer hardware interconnect allows data to be transferred between offload engines without the involvement of system software. Note that the peer-to-peer hardware interconnect may be implemented by dedicated links or system interconnection technologies like PCI Express.

Writing normalized market data to shared (system) memory allows multiple trading applications to view the current state of the market by simply issuing reads to the memory locations associated with the financial instruments of interest. This reduces the latency of data delivery to the trading applications by eliminating the need to receive and parse messages to extract data fields.

An exemplary embodiment of a peer-to-peer hardware interconnect is a PCI Express bus where endpoint devices are each assigned a portion of the addressable memory space. A Base Address Register (BAR) defines the address space assigned to a given device on the bus. If device A issues a write operation to an address within the BAR space associated with device B, data can be transferred directly from device A to device B without involving system software or utilizing host memory. A wide variety of protocols may be developed with this basic capability. Multiple BARs may be employed by a device to implement control structures. For example, specific BARs may be used to maintain read and write pointers for the implementation of a ring buffer or queue for data transfers between devices.

Strategy offload engines 704 may also be hosted in the integrated system. Moreover, such strategy offload engines 704 can be resident in the hardware sub-system 718 as shown in FIG. 7. Like the OME, strategy offload engines may receive normalized market data directly over the peer-to-peer hardware interconnect. Examples of suitable strategy offload engines 704 include an options pricing engine such as described in the above-referenced and incorporated U.S. Pat. App. Pub 2007/0294157, a basket calculation engine as described in the above-referenced and incorporated U.S. Pat. App. Pub. 2009/0182683, engines for performing data cleansing and integrity checks which can employ rules engines such as those described in the above-referenced and incorporated U.S. Pat. App. Pub. 2009/0287628, etc.

Note that a hardware-to-software interconnect channel 710 provides for low-latency, high-bandwidth communication between software and hardware components. An example of a suitable interconnect channel in this regard is described in the above-referenced and incorporated U.S. Pat. App. Pub. 2007/0174841. This facilitates the partitioning of trading strategies across general purpose processing and reconfigurable logic resources. Thus, the strategy offload engines 704 can also interact with the trading strategy applications 712 within the software sub-system of the host through the hardware-software channel 710, where a trading strategy application 712 can offload certain tasks to the hardware-accelerated strategy offload engine 704 for reduced latency processing.

The functions of a traditional OMS/EMS that are not performance-critical (e.g. are not performed on every order) may be hosted on general-purpose processing resources in the system if desired (although a practitioner may want to deploy all functions on high performance resources such as reconfigurable logic devices). These functions may include modification of routing parameters, modification of risk profiles, statistics gathering and monitoring. The software components of the OMS/EMS utilize the same hardware-to-software interconnection channel to communicate with the OME(s), update cached records, etc.

As noted above, in connection with the OME, examples of a suitable computational platform for one or more of the engines 702, 704, and 300 include a reconfigurable logic device (e.g., a field programmable gate array (FPGA) or other programmable logic device (PLD)), a graphics processor unit (GPU), and a chip multiprocessors (CMP). However, it should be understood that one or more of the other engines 702, 704, and 300 could also be deployed on one or more general purpose processors (GPPs) or other appropriately programmed processors if desired for parallel execution within the host. It should also be understood that the engines 702, 704, and 300 may be partitioned across multiple reconfigurable logic devices (or multiple GPUs, CMPs, etc. if desired).

Thus, in embodiments where one or more engines within the hardware sub-system 718 is implemented in reconfigurable logic such as an FPGA, hardware logic will be present on the platform that permits fine-grained parallelism with respect to the different operations that such engines perform, thereby providing such an engine with the ability to operate at hardware processing speeds that are orders of magnitude faster than would be possible through software execution on a GPP.

While the present invention has been described above in relation to its preferred embodiments, various modifications may be made thereto that still fall within the invention's scope as will be recognizable upon review of the teachings herein. As such, the full scope of the present invention is to be defined solely by the appended claims and their legal equivalents.

What is claimed is:

1. An apparatus comprising:
   a member of the group consisting of (1) a reconfigurable logic device, (2) a graphics processor unit (GPU), and (3) a chip multi-processor (CMP), wherein the member is configured as an order management engine, the order management engine configured to process a plurality of orders based on a plurality of inputs, the orders pertaining to a plurality of financial instruments traded on one or more financial markets, wherein the order management engine comprises a plurality of parallel components that (i) are integrated on the member via a plurality of dedicated interconnects and (ii) exploit parallelism internally within the member to operate in parallel with each other;
   wherein the parallel components include a mapping component and an order validation component that are integrated via the dedicated interconnects in a feed-forward orientation to process the orders;
   wherein the mapping component is configured to map the orders to applicable risk data and regulatory data for pre-fetching from memory to seed order validation checks by the order validation component; and
   wherein the order validation component is configured to (1) receive the pre-fetched applicable risk data and regulatory data and (2) perform a plurality of order validation checks on the orders against a plurality of rules in parallel to validate the orders, wherein the rules include rules based on the orders' applicable risk data and regulatory data, the validated orders for transmission to one or more financial markets.

2. The apparatus of claim 1 wherein the inputs comprise at least one member of the group consisting of (1) financial market data from one or more financial market data sources, (2) a plurality of response events from one or more financial market data sources, (3) data from a plurality of individual risk profiles, (4) data from a plurality of corporate risk profiles, (5) data from an entitlement database, (6) data corresponding to a plurality of regulatory parameters, (7) data from a plurality of individual account profiles, (8) data from a plurality of corporate account profiles, and (9) data corresponding to a plurality of order routing parameters.

3. The apparatus of claim 1 wherein the parallel components are deployed on the member as a processing pipeline configured for parallel operation such that each of the parallel components are configured to operate simultaneously.

4. The apparatus of claim 1 wherein the member comprises the reconfigurable logic device.

5. The apparatus of claim 4 wherein the reconfigurable logic device comprises a field programmable gate array (FPGA).

6. The apparatus of claim 1 wherein the member comprises the GPU.

7. The apparatus of claim 1 wherein the member comprises the CMP.

8. A method comprising:
processing a plurality of orders based on a plurality of inputs, the orders pertaining to a plurality of financial instruments traded on one or more financial markets, wherein the processing step is performed by a member of the group consisting of (1) a reconfigurable logic device, (2) a graphics processor unit (GPU), and (3) a chip multi-processor (CMP), wherein the member is configured as an order management engine, the order management engine comprising a plurality of parallel components that (i) are integrated on the member via a plurality of dedicated interconnects and (ii) exploit parallelism internally within the member to operate in parallel with each other, wherein the parallel components include a mapping component and an order validation component that are integrated via the dedicated interconnects in a feed-forward orientation, and wherein the processing step comprises:
the mapping component mapping the orders to applicable risk data and regulatory data for pre-fetching from memory to seed order validation checks by the order validation component; and
the order validation component (1) receiving the pre-fetched applicable risk data and regulatory data and (2) performing a plurality of order validation checks on the orders against a plurality of rules in parallel to validate the orders, wherein the rules include rules based on the orders' applicable risk data and regulatory data, the validated orders for transmission to one or more financial markets.

9. The method of claim 8 wherein the parallel components further include a routing strategy component and an order entry optimization component that are integrated with the mapping component and the order validation component via the dedicated interconnects, the processing step further comprising:
the routing strategy component (1) receiving validated orders from the order validation component and (2) performing a routing strategy operation on the validated orders to determine the financial markets in which to route the validated orders; and
the order entry optimization component (1) receiving the validated orders, (2) receiving a plurality of routing instructions from the routing strategy component that are associated with the validated orders, and (3) performing an order entry optimization operation on the validated orders based on the received routing instructions to generate a plurality of outgoing orders for a plurality of financial markets in accordance with the routing instructions.

10. The method of claim 8 wherein the parallel components are deployed on the member as a processing pipeline, the parallel components operating simultaneously in parallel through the pipeline.

11. The method of claim 8 wherein the member comprises the reconfigurable logic device.

12. The method of claim 11 wherein the reconfigurable logic device comprises a field programmable gate array (FPGA).

13. The method of claim 8 wherein the member comprises the GPU.

14. The method of claim 8 wherein the member comprises the CMP.

15. The apparatus of claim 1 wherein the parallel components further include a market view component, wherein the market view component is configured to maintain a current market view, the current market view comprising a current view of pricing and liquidity in one or more financial markets for one or more financial instruments;
wherein the mapping component is further configured to map the orders to their applicable financial instruments to initiate a retrieval from the market view component of current pricing information within the current market view for the applicable financial instruments; and
wherein the order validation component is further configured to receive the retrieved relevant current pricing information for the orders from the market view component via the dedicated interconnects, and wherein the rules include rules that are based on the orders' relevant current pricing information.

16. The apparatus of claim 15 wherein the dedicated interconnects connect the mapping component with the market view component;
wherein the mapping component is further configured to (1) resolve instrument identifiers for the orders and (2) provide the resolved instrument identifiers to the market view component via the dedicated interconnects to initiate retrieval of the relevant current pricing information; and
wherein the market view component is further configured to (1) retrieve the current pricing information for the financial instruments applicable to the orders based on the resolved instrument identifiers and (2) provide the retrieved current pricing information to the order validation component via the dedicated interconnects.

17. The apparatus of claim 1 wherein the parallel components further include a routing strategy component, the routing strategy component configured to (1) receive validated orders from the order validation component and (2) perform a routing strategy operation on the validated orders to determine a plurality of financial markets to which to route the validated orders, and wherein the dedicated interconnects connect the order validation component with the routing strategy component in the feed-forward orientation.

18. The apparatus of claim 17 wherein the parallel components further include a market view component, wherein the market view component is configured to maintain a current market view, the current market view comprising a current view of pricing and liquidity in one or more financial markets for one or more financial instruments;
  wherein the mapping component is further configured to map the orders to their applicable financial instruments to initiate a retrieval from the market view component of current pricing information within the current market view for the applicable financial instruments; and
  wherein the routing strategy component is further configured to (1) receive the retrieved relevant current pricing information for the validated orders from the market view component via the dedicated interconnects and (2) determine which of the financial markets to route the validated orders to based on the received relevant current pricing information for the validated orders.

19. The apparatus of claim 18 wherein the dedicated interconnects connect the mapping component with the market view component;
  wherein the mapping component is further configured to (1) resolve instrument identifiers for the orders and (2) provide the resolved instrument identifiers to the market view component via the dedicated interconnects to initiate retrieval of the relevant current pricing information;
  wherein the market view component is further configured to (1) retrieve the current pricing information for the financial instruments applicable to the orders based on the resolved instrument identifiers and (2) provide the retrieved current pricing information to the routing strategy component via the dedicated interconnects.

20. The apparatus of claim 1 wherein the parallel components communicate via the dedicated interconnects without using general-purpose messaging buses.

21. The apparatus of claim 1 wherein the risk data comprises risk data from a corporate account risk profile applicable to the orders, the apparatus further comprising a record cache configured to store the corporate account risk profile, wherein the mapping component initiates retrieval of the risk data from the record cache.

22. The apparatus of claim 1 wherein the risk data comprises risk data from an individual account risk profile applicable to the orders, the apparatus further comprising a record cache configured to store the individual account risk profile, wherein the mapping component initiates retrieval of the risk data from the record cache.

23. The apparatus of claim 1 wherein the risk data comprises (1) first risk data from a corporate account risk profile applicable to the orders and (2) second risk data from an individual account risk profile applicable to the orders, the apparatus further comprising record caches configured to store the corporate account and individual account risk profiles, wherein the mapping component initiates retrieval of the first and second risk data from the record caches.

24. The apparatus of claim 1 wherein the order validation component comprises:
  a plurality of parallel logic instances that are configured to test the orders against the rules in parallel; and
  combinatorial logic that is configured to validate the orders if the parallel logic instances indicate that the orders satisfied all of the rules.

25. The apparatus of claim 24 wherein the order validation component comprises a plurality of buffers that feed the parallel logic instances, the buffers including a first buffer that is configured to buffer data representing the orders, a second buffer that is configured to buffer data representing the risk data applicable to the orders, and a third buffer that is configured to buffer data representing the regulatory data applicable to the orders.

26. The apparatus of claim 17 wherein the routing strategy component is further configured to select a destination market and handling directives for an order or part of an order based on at least one member of the group consisting of (1) a current view of pricing and liquidity available at one or more markets, (2) a current view of pricing and liquidity statistics computed for one or more markets, (3) a current view last trade prices for one or more markets, (4) a current view of trade statistics computed for one or more markets, (5) an estimation of intra-market latency, (6) a plurality of routing parameters from a routing parameter record, (7) a plurality of individual account parameters from an individual account record, and (8) a plurality of corporate account parameters from a corporate account record.

27. The apparatus of claim 15 wherein the order management engine comprises a memory configured to store the current market view.

28. The apparatus of claim 19 wherein the market view component is further configured to provide the retrieved current pricing information to the order validation component via the dedicated interconnects; and
  wherein the order validation component is further configured to receive the retrieved relevant current pricing information for the orders from the market view component via the dedicated interconnects, and wherein the rules include rules that are based on the orders' relevant current pricing information.

29. The apparatus of claim 17 wherein the parallel components further include:
  an order entry optimization component, wherein the dedicated interconnects connect the order entry optimization component with the routing strategy component in the feed-forward orientation, the order entry optimization component configured to (1) receive the validated orders, (2) receive a plurality of routing instructions from the routing strategy component that are associated with the validated orders, and (3) perform the order entry optimization operation on the validated orders based on the received routing instructions to generate a plurality of outgoing orders for a plurality of financial markets in accordance with the routing instructions.

30. The apparatus of claim 18 wherein the parallel components further include: a position blotter update component configured to track a plurality of positions relating to the orders.

31. The apparatus of claim 27 wherein the memory comprises a shared memory, wherein the shared memory is shared between the order management engine and a ticker plant engine;
  wherein the ticker plant engine is configured to write normalized financial market data to the shared memory via a peer-to-peer hardware interconnect; and
  wherein the market view component is further configured to generate the current market view based on the normalized financial market data in the shared memory.

32. The apparatus of claim 30 wherein the position blotter update component is further configured to (1) receive a plurality of response events from the one or more financial markets that are responsive to a plurality of previous orders from the order management engine and (2) update the tracked positions based on the received response events.

33. The apparatus of claim 32 wherein the dedicated interconnects connect the position blotter update component with the market view component, and wherein the market view component is further configured to further update the current market view for one or more financial instruments on one or more financial markets based on the positions tracked by the position blotter update component.

34. The apparatus of claim 32 wherein the dedicated interconnects connect the position blotter update component with the order validation component, and wherein the rules include rules that are based on positions tracked by the position blotter update component.

35. The apparatus of claim 32 wherein the dedicated interconnects connect the position blotter update component with the routing strategy component, and wherein the routing strategy component is further configured to determine which of the financial markets to route the validated orders to based on positions tracked by the position blotter update component.

36. The apparatus of claim 29 wherein the parallel components further include a latency monitor component, the latency monitor component configured to estimate intra-market latency for one or more order entry channels.

37. The apparatus of claim 36 wherein the latency monitor component is further configured to estimate intra-market latency for one or more financial instruments for one or more order entry channels.

38. The apparatus of claim 36 wherein the latency monitor component is further configured to estimate intra-market latency for one or more order types for one or more order entry channels.

39. The apparatus of claim 36 wherein the latency monitor component is further configured to estimate intra-market latency based on measurements of a round-trip-time from (1) a transmission of an outgoing order event to a market to (2) a receipt of a corresponding order entry response event from the market.

40. The apparatus of claim 39 wherein the latency monitor component is further configured to measure round-trip-time by (1) recording a timestamp for a transmission of each of a plurality of outgoing order events, (2) recording a timestamp for a receipt of each of a plurality of order entry response events, (3) identifying the outgoing order events that correspond to order entry response events, and (4) computing the difference in timestamps as between the identified outgoing order events and their corresponding order entry response events.

41. The apparatus of claim 36 wherein the dedicated interconnects connect the latency monitor component with the order entry optimization component, wherein the latency monitor component is further configured to communicate intra-market latency data to the order entry optimization component, and wherein the order entry optimization component is further configured to perform the order entry optimization operation based on the received routing instructions and the communicated intra-market latency data to generate the outgoing orders.

42. The apparatus of claim 36 wherein the dedicated interconnects connect the latency monitor component with the routing strategy component, wherein the latency monitor component is further configured to communicate intra-market latency data to the routing strategy component, and wherein the routing strategy component is further configured to determine which of the financial markets to route the validated orders to based on the communicated intra-market latency data.

43. The apparatus of claim 33 wherein the order management engine comprises a shared memory, wherein the shared memory is shared between the order management engine and a ticker plant engine;
    wherein the ticker plant engine is configured to write normalized financial market data to the shared memory via a peer-to-peer hardware interconnect;
    wherein the market view component is further configured to generate a book that provides pricing and liquidity information for a plurality of financial instruments based on the normalized financial market data in the shared memory and the positions tracked by the position blotter update component; and
    wherein the market view component is further configured to maintain a cache of updates triggered by the positions tracked by the position blotter update component to prevent redundant updates to the book.

44. The apparatus of claim 29 wherein the order entry optimization component is further configured to perform the order entry optimization operation based on at least one member of the group consisting of (1) a plurality of estimates of intra-market latency and (2) a plurality of directives specified by the routing strategy component.

45. The apparatus of claim 29 wherein the parallel components further include a market view component, wherein the market view component is configured to maintain a current market view, the current market view comprising a current view of pricing and liquidity in one or more financial markets for one or more financial instruments;
    wherein the mapping component is further configured to map the orders to their applicable financial instruments to initiate a retrieval from the market view component of current pricing information within the current market view for the applicable financial instruments; and
    wherein the order entry optimization component is further configured to (1) receive the retrieved relevant current pricing information for the orders from the market view component via the dedicated interconnects and (2) perform the order entry optimization operation on the validated orders based on the received routing instructions and the received relevant current pricing information for the orders to generate the outgoing orders.

46. The apparatus of claim 31 wherein the market view component is further configured to update the current market view based on a plurality of order entry confirmation and order fill reports received from a plurality of the one or more financial markets.

47. The apparatus of claim 45 wherein the market view component is further configured to generate the current market view from an input comprising financial market data relating to the one or more financial instruments.

48. The apparatus of claim 45 wherein the current market view includes a pricing and liquidity statistics view relating to the one or more financial instruments.

49. The apparatus of claim 45 wherein the current market view includes a last trade pricing view relating to the one or more financial instruments.

50. The apparatus of claim 45 wherein the current market view includes a last trade statistics view relating to the one or more financial instruments.

51. The apparatus of claim 45 wherein the current market view comprises a current composite view of pricing and liquidity across a plurality of financial markets for one or more financial instruments.

* * * * *